US012766828B2

(12) United States Patent
Mikashima et al.

(10) Patent No.: US 12,766,828 B2
(45) Date of Patent: Oct. 20, 2026

(54) INKJET RECORDING APPARATUS

(71) Applicant: KYOCERA Document Solutions Inc., Osaka (JP)

(72) Inventors: Katsuo Mikashima, Osaka (JP); Yuichiro Kurokawa, Osaka (JP); Koji Kusumoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 133 days.

(21) Appl. No.: 18/821,456

(22) Filed: Aug. 30, 2024

(65) Prior Publication Data

US 2025/0074046 A1 Mar. 6, 2025

(30) Foreign Application Priority Data

Sep. 5, 2023 (JP) ................................ 2023-143314
Jan. 11, 2024 (JP) ................................ 2024-002311

(51) Int. Cl.
*B41J 2/045* (2006.01)
*B41J 2/14* (2006.01)

(52) U.S. Cl.
CPC ....... *B41J 2/04541* (2013.01); *B41J 2/04548* (2013.01); *B41J 2/04581* (2013.01); *B41J 2/0451* (2013.01); *B41J 2002/14491* (2013.01)

(58) Field of Classification Search
CPC ......................... B41J 2/04541; B41J 2/04548; B41J 2/04581; B41J 2/0451; B41J 2002/14491; B41J 29/393; B41J 2/01; B41J 2/04501
See application file for complete search history.

(56) References Cited

U.S. PATENT DOCUMENTS

2022/0072849 A1 3/2022 Nagane

FOREIGN PATENT DOCUMENTS

CN 105922736 A * 9/2016 ................ B41J 2/09
JP 2022046235 A 3/2022

* cited by examiner

*Primary Examiner* — Justin Seo
(74) *Attorney, Agent, or Firm* — Alleman Hall LLP

(57) ABSTRACT

Termination resistors are connected to second signal lines, respectively. A plurality of piezoelectric elements are respectively supplied with a plurality of drive signals corresponding to a plurality of control signals received by a plurality of receiving circuits. In a control device, a test voltage is supplied to a plurality of test resistors from a test voltage output circuit, and the plurality of test resistors, together with the termination resistors, respectively constitute a plurality of voltage dividing circuits. A divided voltage detection circuit detects an output voltage of each voltage dividing circuit. A control circuit controls an operating voltage output circuit, a plurality of control signal output circuits, and a test voltage output circuit so as to be in a test state, and determines whether an electrical connection state is normal or abnormal depending on a detection result of the divided voltage detection circuit in the test state.

8 Claims, 12 Drawing Sheets

INKJET RECORDING APPARATUS

INCORPORATION BY REFERENCE

This application is based upon and claims the benefit of priority from the corresponding Japanese Patent Application No. 2023-143314 filed on Sep. 5, 2023, and 2024-002311 filed on Jan. 11, 2024, the entire contents of which are incorporated herein by reference.

BACKGROUND

The present disclosure relates to an inkjet recording apparatus having a function for testing a connection state between a control device and an inkjet unit.

The inkjet recording apparatus includes an inkjet unit and a control device that controls the inkjet unit.

The inkjet unit includes a plurality of piezoelectric elements each of which is supplied with a drive signal, and a plurality of nozzles that eject ink pressurized by the plurality of piezoelectric elements.

When a printing process is executed, the control device outputs to the inkjet unit a plurality of control signals that are generated based on an operating voltage and data of an image to be output. In the inkjet unit, a plurality of receiving circuits receive the plurality of control signals, and a plurality of drive signals corresponding to the plurality of control signals are supplied to the plurality of piezoelectric elements.

The control device and the inkjet unit are connected by a wire harness. The wire harness has a plurality of electric wires for transmitting the operating voltage and the plurality of control signals supplied to the inkjet unit.

A first end portion of the wire harness is connected to a first connector provided on the control device, and a second end portion of the wire harness is connected to a second connector provided on the inkjet unit.

A poor electrical connection may occur between the first connector and the wire harness, and between the second connector and the wire harness. In this case, when the control device outputs the operating voltage and the plurality of control signals, various problems may occur.

For example, a technique is known of a plurality of terminals of a flexible cable including an input terminal to which a test signal is input and an output terminal corresponding to the input terminal, and checking whether a signal identical to the test signal is detected at the output terminal.

In a case in which a signal identical to the test signal is not detected at the output terminal, it is determined that the flexible cable is inserted into the connector at an angle. The flexible cable is an example of a wire harness.

SUMMARY

An inkjet recording apparatus according to an aspect of the present disclosure includes a control device and an inkjet unit connected by a wire harness. The control device includes an operating voltage output circuit, a plurality of control signal output circuits, and a first connector. The operating voltage output circuit is capable of outputting an operating voltage. The plurality of control signal output circuits are each capable of outputting a plurality of control signals. The first connector includes a plurality of first terminals connected to a first voltage line that transmits an operating voltage and a plurality of first signal lines that transmit the plurality of control signals, the first connector being connected to a first end portion of the wire harness. The inkjet unit includes a second connector, a plurality of receiving circuits, a plurality of termination resistors, a plurality of piezoelectric elements, and a plurality of nozzles. The second connector includes a plurality of second terminals and is connected to a second end portion of the wire harness. The plurality of receiving circuits are each supplied with the operating voltage and the plurality of control signals via a second voltage line and a plurality of second signal lines connected to the plurality of second terminals. The plurality of termination resistors are respectively connected to the plurality of second signal lines; The plurality of piezoelectric elements are each supplied with a plurality of drive signals corresponding to the plurality of control signals received by the plurality of receiving circuits. The plurality of nozzles are configured to eject ink pressurized by the plurality of piezoelectric elements. The control device further includes a test voltage output circuit, a plurality of test resistors, a divided voltage detection circuit, and a control circuit. The test voltage output circuit is capable of outputting a test voltage. The plurality of test resistors are supplied with the test voltage from the test voltage output circuit, and together with the plurality of termination resistors, constitute a plurality of voltage dividing circuits. The divided voltage detection circuit is configured to detect an output voltage of each of the plurality of voltage dividing circuits. The control circuit is configured to control the operating voltage output circuit, the plurality of control signal output circuits and the test voltage output circuit. The control circuit executes a test process of controlling the operating voltage output circuit, the plurality of control signal output circuits, and the test voltage output circuit so as to be in a test state, and determining, according to a detection result of the divided voltage detection circuit in the test state, whether an electrical connection state between the plurality of first terminals and the plurality of second terminals is normal or abnormal. The control circuit, after determining by the test process that the electrical connection state is normal, further executes ink ejection control by causing the operating voltage output circuit to output the operating voltage, while causing some or all of the plurality of control signal output circuits to output some or all of the plurality of control signals.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments according to the present disclosure will be described with reference to the drawings. Note that the following embodiments are examples of a technique according to the present disclosure and do not limit the technical scope of the present disclosure.

First Embodiment

An inkjet recording apparatus 10 according to the present embodiment is an image forming apparatus capable of performing a printing process by an inkjet method. For example, the inkjet recording apparatus 10 is a printer, a facsimile machine, a copier, a multifunction peripheral, or the like.

The printing process is a process for forming an image on a recording medium. In the present embodiment, the recording medium is a sheet 9 such as paper or a resin film. The sheet 9 is an example of the recording medium.

[Configuration of Inkjet Recording Apparatus 10]

Figure 1:
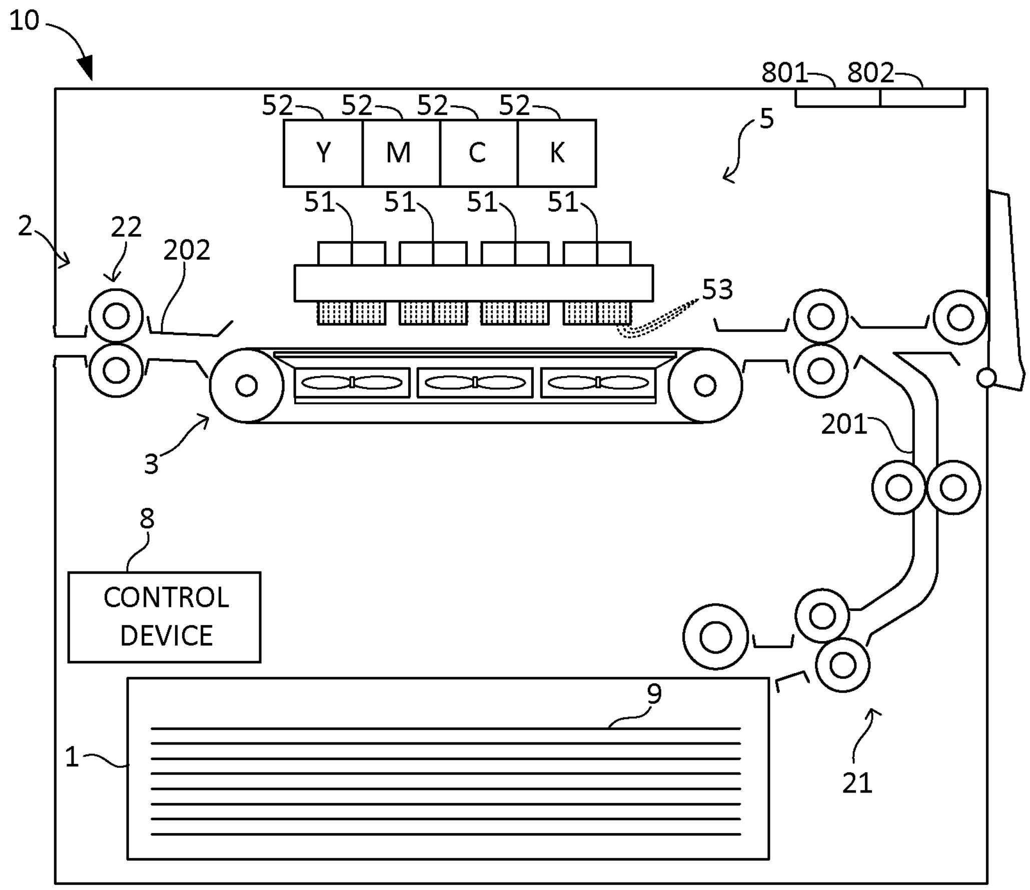
FIG. 1 is a diagram showing a configuration of an inkjet recording apparatus according to a first embodiment.

As shown in FIG. 1, the inkjet recording apparatus 10 includes a sheet storing portion 1, a sheet conveying device 2, a printing device 5, and a control device 8 (see FIG. 1). Furthermore, the inkjet recording apparatus 10 also includes an operation device 801 and a display device 802.

The control device 8 controls the sheet conveying device 2 and the printing device 5. The control device 8 constitutes a part of the sheet conveying device 2 and a part of the printing device 5.

The operation device 801 is a device that receives operations by a person. For example, the operation device 801 includes operation buttons and a touch panel.

The display device 802 is a device that displays information. For example, the display device 802 includes a panel display device such as a liquid-crystal display unit.

The sheet conveying device 2 conveys the sheets 9 stored in the sheet storing portion 1 one by one. The sheet conveying device 2 includes a front-stage conveying device 21, a belt conveying device 3, and a rear-stage conveying device 22.

The front-stage conveying device 21 sends out the sheet 9 from the sheet storing portion 1 to a primary conveying path 201. The primary conveying path 201 is a conveying path for the sheet 9 and is formed between the sheet storing portion 1 and the belt conveying device 3.

Furthermore, the front-stage conveying device 21 conveys the sheet 9 along the primary conveying path 201, and further sends the sheet 9 from the primary conveying path 201 to the belt conveying device 3.

The belt conveying device 3 takes over the conveying of the sheet 9 from the front-stage conveying device 21. The belt conveying device 3 conveys the sheet 9 along a flat path, and then sends the sheet 9 from the flat path to a secondary conveying path 202.

The secondary conveying path 202 is a conveying path for the sheet 9 and is formed at the rear stage of the belt conveying device 3.

The rear-stage conveying device 22 takes over the conveying of the sheet 9 from the belt conveying device 3. The rear-stage conveying device 22 conveys the sheet 9 along the secondary conveying path 202, and further sends the sheet 9 from the secondary conveying path 202 to a rear-stage portion (not shown). For example, the rear-stage portion is a discharge tray, a post-processing device, an intermediate conveying device, or the like.

The printing device 5 executes a printing process on the sheet 9 conveyed by the belt conveying device 3.

In the example shown in FIG. 1, the printing device 5 includes a plurality of inkjet units 51 corresponding to a plurality of colors, and a plurality of ink supply portions 52.

The plurality of ink supply portions 52 each supply ink to the plurality of inkjet units 51. Each of the inkjet units 51 forms an image on the sheet 9 by ejecting ink droplets onto the sheet 9.

[Configuration of Control Device 8]

Figure 3:
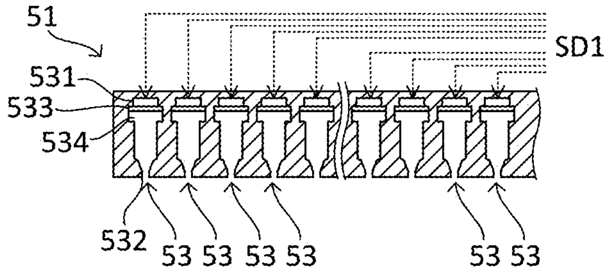
FIG. 3 is a cross-sectional view of a portion of an inkjet unit in the inkjet recording apparatus according to the first embodiment.

The control device 8 includes a central processing unit (CPU) 81, a random access memory (RAM) 82, a secondary storage device 83, a signal interface 84, a communication device 85, an inkjet control device 4, and the like (see FIG. 3).

The secondary storage device 83 is a computer-readable non-volatile storage device. The secondary storage device 83 is capable of storing and updating computer programs and various types of data. For example, a flash memory or a hard disk drive, or both, may be employed as the secondary storage device 83.

The signal interface 84 converts signals output by various types of sensors into digital data, and transmits the converted digital data to the CPU 81. Furthermore, the signal interface 84 converts a control command output by the CPU 81 into a control signal, and transmits the control signal to a device to be controlled.

The communication device 85 executes communication with other devices such as a host device (not shown). The CPU 81 communicates with the other devices via the communication device 85.

Figure 2:
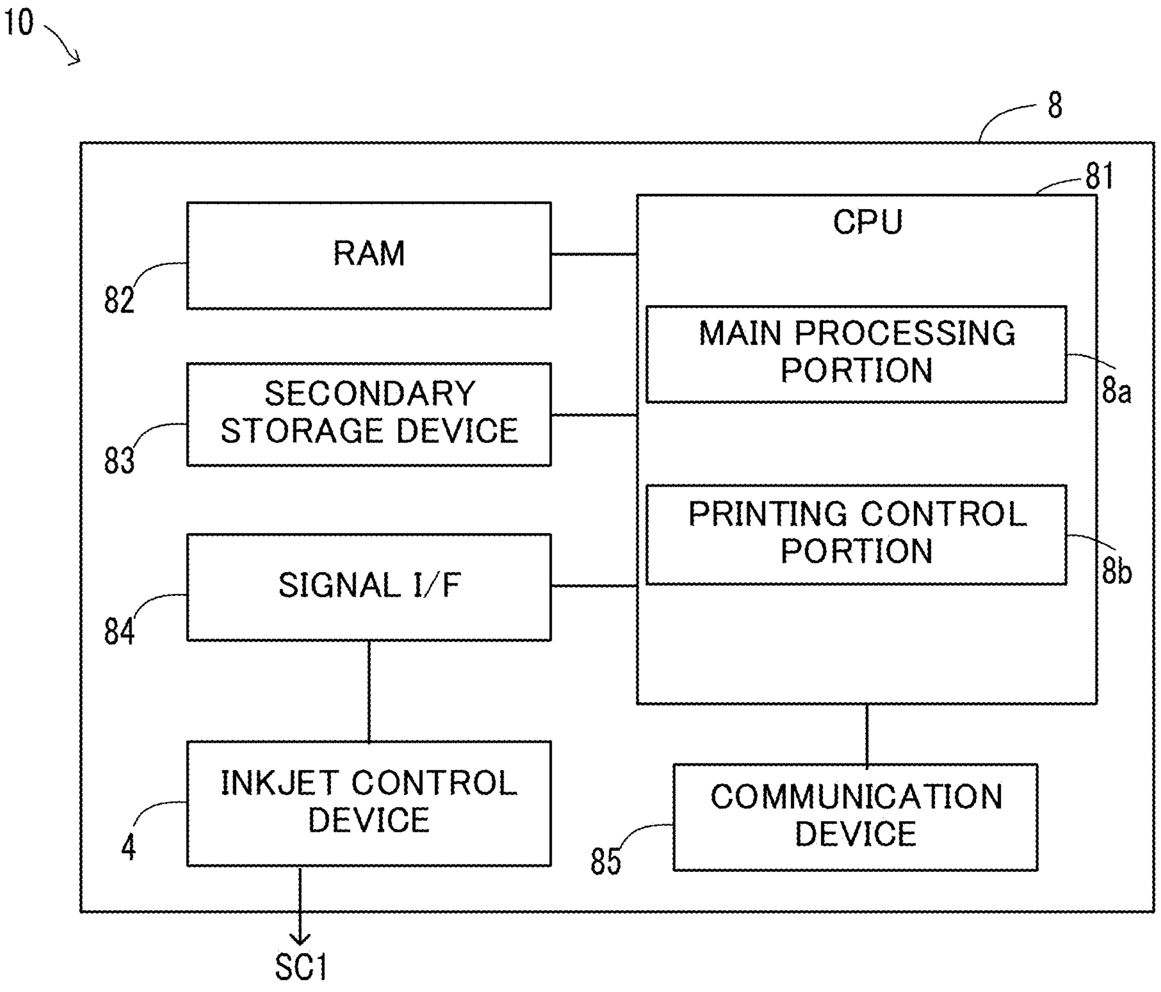
FIG. 2 is a block diagram showing a configuration of a control device in the inkjet recording apparatus according to the first embodiment.

The inkjet control device 4 generates a control signal SC1 and supplies the control signal SC1 to each of the inkjet units 51. The control signal SC1 is a command signal that indicates the type of the drive signal SD1 that is supplied to one or more drive piezoelectric elements that are periodically selected from among the plurality of piezoelectric elements 531 (see FIGS. 2 and 3). For example, the inkjet control device 4 generates a control signal SC1 that represents the grayscale of the drive signal SD1 according to the droplet size. The droplet size is the size of the ink droplets that are ejected onto the sheet 9.

The CPU 81 is a processor that executes various types of data processing and control be executing a computer program. The control device 8 including the CPU 81 controls the sheet conveying device 2, the printing device 5, and the like.

The RAM 82 is a computer-readable volatile storage device. The RAM 82 temporarily stores the computer programs executed by the CPU 81 and data that is output and referenced by the CPU 81 in the course of executing various types of processes.

The CPU 81 includes a plurality of processing modules that are achieved by executing the computer programs. The plurality of processing modules include a main processing portion 8*a* and a printing control portion 8*b*.

The main processing portion 8*a* executes processes to start various types of processes in response to the occurrence of various types of processing events, control of the display device 802, and the like. The processing events include an operation event and a receiving event.

The operation event is an event in which an operation on the operation device 801 is detected. The reception event is an event in which various types of processing requests are received through the communication device 85. The processing request includes a print request for requesting execution of the printing process.

The printing control portion 8*b* controls the sheet conveying device 2 and the printing device 5. The printing control portion 8*b* controls conveying of the sheet 9 by controlling the sheet conveying device 2.

Furthermore, the printing control portion 8*b* controls the printing device 5 by controlling the inkjet control device 4. The printing control portion 8*b* causes the printing device 5 to execute the printing process in synchronization with the conveying of the sheet 9 by the sheet conveying device 2.

For example, when the print request is received by the communication device 85, the printing control portion 8*b* causes the sheet conveying device 2 to convey the sheet 9 and causes the printing device 5 to execute the printing process.

[Configuration of the Plurality of Ink Ejection Portions 53]

Each of the inkjet units 51 has a plurality of ink ejection portions 53 (see FIGS. 1 and 3). The ink ejection portions 53 are arranged opposite to an upper surface of a conveying belt 31.

Each ink ejection portion 53 includes a piezoelectric element 531, a nozzle 532, a vibration plate 533, and a pressure chamber 534. That is, each of the inkjet units 51 includes a plurality of piezoelectric elements 531, a plurality of nozzles 532, a plurality of vibration plates 533, and a plurality of pressure chambers 534.

Each pressure chamber 534 communicates with each nozzle 532. Each of the vibration plates 533 forms a part of a partition wall of each of the pressure chambers 534. Each piezoelectric element 531 pressurizes the ink in the pressure chamber 534 via the vibration plate 533 when a drive signal SD1 corresponding to each control signal SC1 is supplied to the piezoelectric element 531.

The inkjet control device 4 is capable of supplying, to each of the inkjet units 51, a plurality of control signals SC 1 that indicate the types of a plurality of drive signals SD1 to be supplied to the plurality of piezoelectric elements 531. Each piezoelectric element 531 pressurizes the ink inside the plurality of pressure chambers 534 and the plurality of nozzles 532 when each drive signal SD 1 is supplied to the piezoelectric element 531. Thus, the plurality of nozzles 532 eject ink that has been pressurized by the plurality of piezoelectric elements 531. Each of the piezoelectric elements 531 is, for example, a piezo element.

[Configuration of Inkjet Control Device 4 and Inkjet Unit 51]

Figure 4:
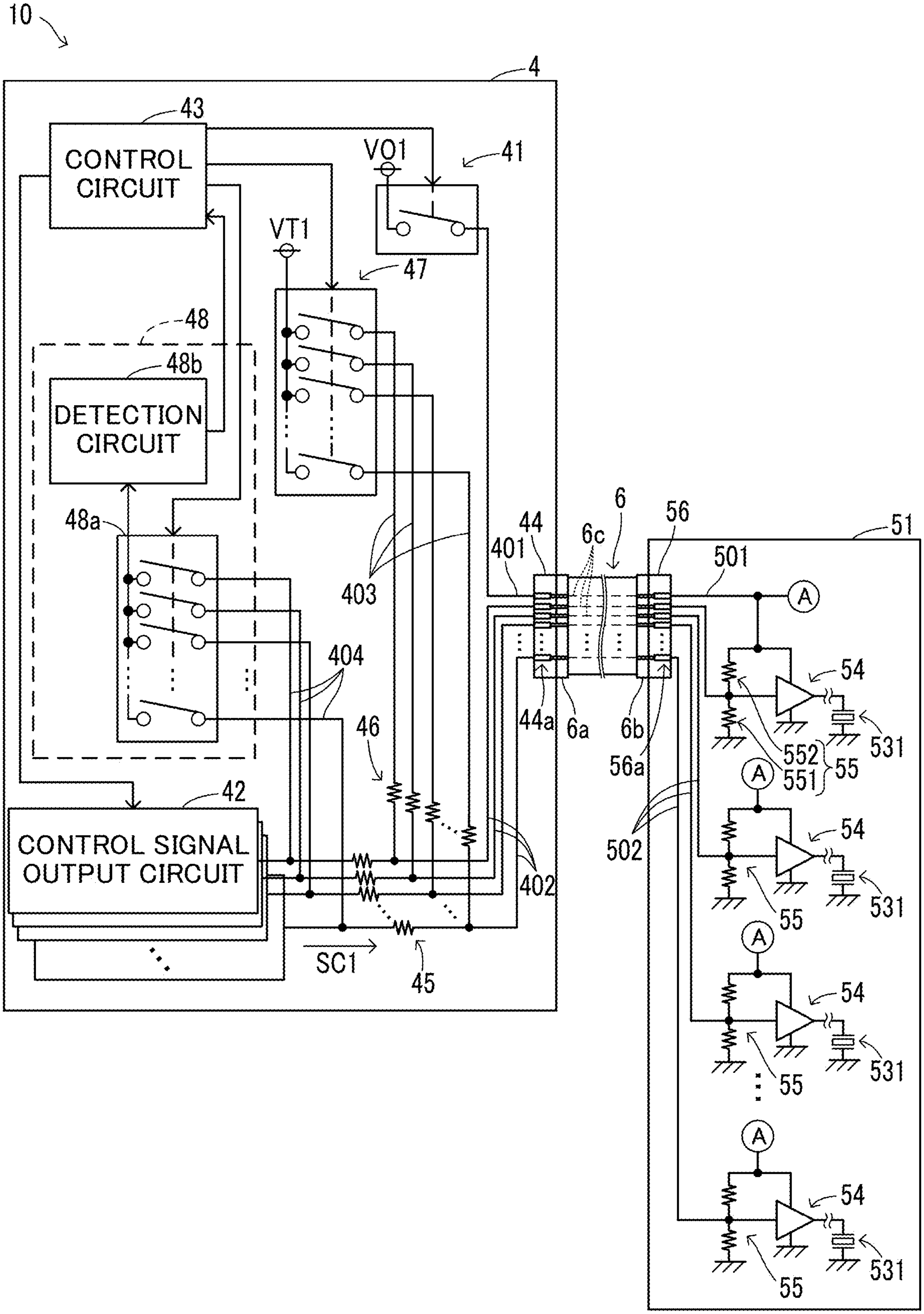
FIG. 4 is a diagram showing a configuration of the electrical system of the control device and inkjet unit in the inkjet recording apparatus according to the first embodiment.

The inkjet recording apparatus 10 further includes a plurality of wire harnesses 6 that connect the inkjet control device 4 to each of the inkjet units 51 (see FIG. 4). That is, the inkjet control device 4 and the inkjet unit 51 are connected to each other by a wire harness 6.

The inkjet control device 4 includes an operating voltage output circuit 41, a plurality of control signal output circuits 42, a control circuit 43, and a first connector 44 (see FIG. 4). The control circuit 43 controls the operating voltage output circuit 41 and the plurality of control signal output circuits 42.

The operating voltage output circuit 41 is capable of outputting an operating voltage VO1 in accordance with an operating command from the control circuit 43. The plurality of control signal output circuits 42 are capable of outputting a plurality of control signals SC in accordance with a drive command from the control circuit 43.

The inkjet control device 4 further includes a first voltage line 401 for transmitting the operating voltage VO1, and a plurality of first signal lines 402 for transmitting a plurality of control signals SC1.

The first connector 44 includes a plurality of first terminals 44*a* connected to the first voltage line 401 and the plurality of first signal lines 402. The first connector 44 is connected to the first harness connector 6*a*, which is the first end portion of the wire harness 6.

The inkjet unit 51 further includes a plurality of receiving circuits 54, a plurality of terminating circuits 55, and a second connector 56 (see FIG. 4). The plurality of receiving circuits 54 and the plurality of terminating circuits 55 each correspond to the plurality of piezoelectric elements 531.

The second connector 56 includes a plurality of second terminals 56*a* that correspond to the plurality of first terminals 44*a*. The second connector 56 is connected to a second harness connector 6*b* that is the second end portion of the wire harness 6.

The wire harness 6 includes a plurality of electric wires 6*c* extending from a first harness connector 6*a* to the second harness connector 6*b*. In a state in which the wire harness 6 is normally connected to the first connector 44 and the second connector 56, the plurality of electric wires 6*c* electrically connect the plurality of first terminals 44*a* and the plurality of second terminals 56*a*.

The inkjet unit 51 further includes a second voltage line 501 and a plurality of second signal lines 502 connected to the plurality of second terminals 56*a*.

The second voltage line 501 transmits the operating voltage VO1 supplied to the inkjet unit 51 via the first voltage line 401 and the wire harness 6. The plurality of second signal lines 502 transmit a plurality of control signals SC that are supplied to the inkjet unit 51 via the plurality of first signal lines 402 and the wire harness 6.

The plurality of receiving circuits 54 are supplied with the operating voltage VO1 and the plurality of control signals SC1 via the second voltage line 501 and the plurality of second signal lines 502, respectively. The plurality of receiving circuits 54 each receive a plurality of control signals SC1. Each receiving circuit 54 extracts a specific signal component from each control signal SC1. The specific signal component indicates the type of the drive signal SD 1 supplied to each of the piezoelectric elements 531 electrically connected to each of the receiving circuits 54.

The inkjet unit 51 further includes a drive circuit (not shown) that is connected to the plurality of receiving circuits 54 and the plurality of piezoelectric elements 531. The drive circuit generates drive signals SD1 corresponding to the specific signal components extracted by the receiving circuits 54, respectively, and supplies the generated drive signals SD1 to the piezoelectric elements 531, respectively.

That is, the plurality of piezoelectric elements 531 are respectively supplied with the plurality of drive signals SD1 corresponding to the plurality of drive signals SC1 received by the plurality of receiving circuits 54.

The plurality of termination circuits 55 are connected to the plurality of second signal lines 502, respectively. The plurality of termination circuits 55 include a plurality of first termination resistors 551 and a plurality of second termination resistors 552.

The plurality of first termination resistors 551 are respectively connected to the plurality of second signal lines 502 and a ground line. The plurality of second termination resistors 552 are connected to the second voltage line 501 and the plurality of second signal lines 502, respectively.

The plurality of termination circuits 55 are provided in order to prevent signal reflection in the plurality of second signal lines 502.

Note that the inkjet control device 4 also includes a plurality of termination resistors 45 connected to the plurality of first signal lines 402. The plurality of termination resistors 45 are connected to the plurality of first signal lines 402 in the vicinity of an output end of the inkjet control device 4.

A poor electrical connection between the first connector 44 and the second connector 56 and the wire harness 6 may occur. In this case, when the inkjet control device 4 outputs the operating voltage VO1 and the plurality of control signals SC1, various problems may occur.

Poor electrical connection between the inkjet control device 4 and the inkjet unit 51 and the wire harness 6 can occur not only when the connectors 6*a*, 6*b* of the wire harness 6 are inserted at an angle, but also individually at each of the first terminals 44*a* or each of the second terminals 56*a*.

For example, a foreign object may be caught in a portion of the plurality of first terminals 44*a* or the plurality of second terminals 56*a*, or a portion of the plurality of electric wires 6*c* in the wire harness 6 may be broken.

The inkjet control device 4 includes a configuration for detecting a poor electrical connection at a portion of the plurality of first terminals 44*a* or the plurality of second terminals 56*a*. The configuration will be described below.

The inkjet control device 4 further includes a test voltage output circuit 47, a plurality of test resistors 46, and a divided voltage detection circuit 48 (see FIG. 4).

The test voltage output circuit 47 is capable of outputting a test voltage VT1 to each of the plurality of test resistors 46 in accordance with a test output command from the control circuit 43.

The plurality of test resistors 46 are supplied with the test voltage VT1 from the test voltage output circuit 47, and together with the plurality of first termination resistors 551, constitute a plurality of voltage dividing circuits.

As shown in FIG. 4, the inkjet control device 4 has a plurality of test signal lines 403 connected to the test voltage output circuit 47 and the plurality of first signal lines 402. The plurality of test resistors 46 are arranged on the plurality of test signal lines 403, respectively.

Therefore, the plurality of test resistors 46 and the plurality of first termination resistors 551 are electrically connected in series by the plurality of test signal lines 403, the plurality of first signal lines 402, some of the plurality of electric wires 6*c* of the wire harness 6, and the plurality of second signal lines 502, respectively.

The plurality of test resistors 46 and the plurality of first termination resistors 551 electrically connected in series constitute the plurality of voltage dividing circuits.

The test voltage output circuit 47 can selectively output the test voltage VT1 to some or all of the plurality of test signal lines 403. That is, the test voltage output circuit 47 can selectively output the test voltage VT1 to some or all of the plurality of voltage dividing circuits.

The divided voltage detection circuit 48 detects the output voltage of each of the plurality of voltage dividing circuits. That is, when the test voltage VT1 is output to each of the plurality of voltage dividing circuits, the divided voltage detection circuit 48 detects the voltage obtained by dividing the test voltage VT1 by each of the plurality of test resistors 46 and each of the plurality of first termination resistors 551.

The output voltages of the plurality of voltage dividing circuits are input to the divided voltage detection circuit 48 via a plurality of detection lines 404. The divided voltage detection circuit 48 includes a switch circuit 48*a* and a detection circuit 48*b*.

The switch circuit 48*a*, in accordance with a selection command from the control circuit 43, electrically connects one target detection line selected from the plurality of detection lines 404 to the detection circuit 48*b*. The detection circuit 48*b* detects the voltage of the target detection line.

In the example shown in FIG. 4, the multiple detection lines 404 electrically connect the divided voltage detection circuit 48 to the portions of the multiple first signal lines 402 between the multiple termination resistors 45 and the multiple control signal output circuits 42.

In the example shown in FIG. 4, the output voltage of each of the plurality of voltage dividing circuits is input to a divided voltage detection circuit 48 at a level dropped at each of the plurality of termination resistors 45. However, since the resistance value of each of the termination resistors 45 is small, the amount of voltage drop at each of the termination resistors 45 is small.

The detection circuit 48*b* transmits a voltage detection signal representing the detected voltage level to the control circuit 43. The control circuit 43 determines the level of the voltage detection signal taking into consideration the amount of voltage drop in each of the termination resistors 45.

Note that the control circuit 43 may also function as the detection circuit 48*b*. In addition, the control circuit 43 may also function as the divided voltage detection circuit 48.

The control circuit 43 controls the operating voltage output circuit 41, the plurality of control signal output circuits 42, the test voltage output circuit 47, and the switch circuit 48*a* of the divided voltage detection circuit 48.

For example, the control circuit 43 is achieved by a micro processing unit (MPU), an application specific integrated circuit (ASIC), or a digital signal processor (DSP). Note that the CPU 81 may also function as a part or the whole of the control circuit 43.

The control circuit 43 executes a test process that determines whether the electrical connection state between the plurality of first terminals 44*a* and the plurality of second terminals 56*a* is normal or abnormal.

In the test process, the control circuit 43 controls the operating voltage output circuit 41, the plurality of control signal output circuits 42, and the test voltage output circuit 47 to a predetermined test state. Furthermore, the control circuit 43 determines whether the electrical connection state is normal or abnormal according to the detection result of the divided voltage detection circuit 48 in the test state.

After the test process has determined that the electrical connection state is normal, the control circuit 43 executes ink ejection control. In other words, the control circuit 43 allows the execution of the ink ejection control on the condition that the electrical connection state is determined to be normal by the test process.

In the ink ejection control, the control circuit 43 causes the operating voltage output circuit 41 to output the operating voltage VO1, while causing some or all of the plurality of control signal output circuits 42 to output some or all of the plurality of control signals SC1.

For example, the control circuit 43 executes the test process when the inkjet recording apparatus 10 is started up. In addition, the control circuit 43 may also execute the test process each time a new print request is received.

[Test Process]

Figure 5:
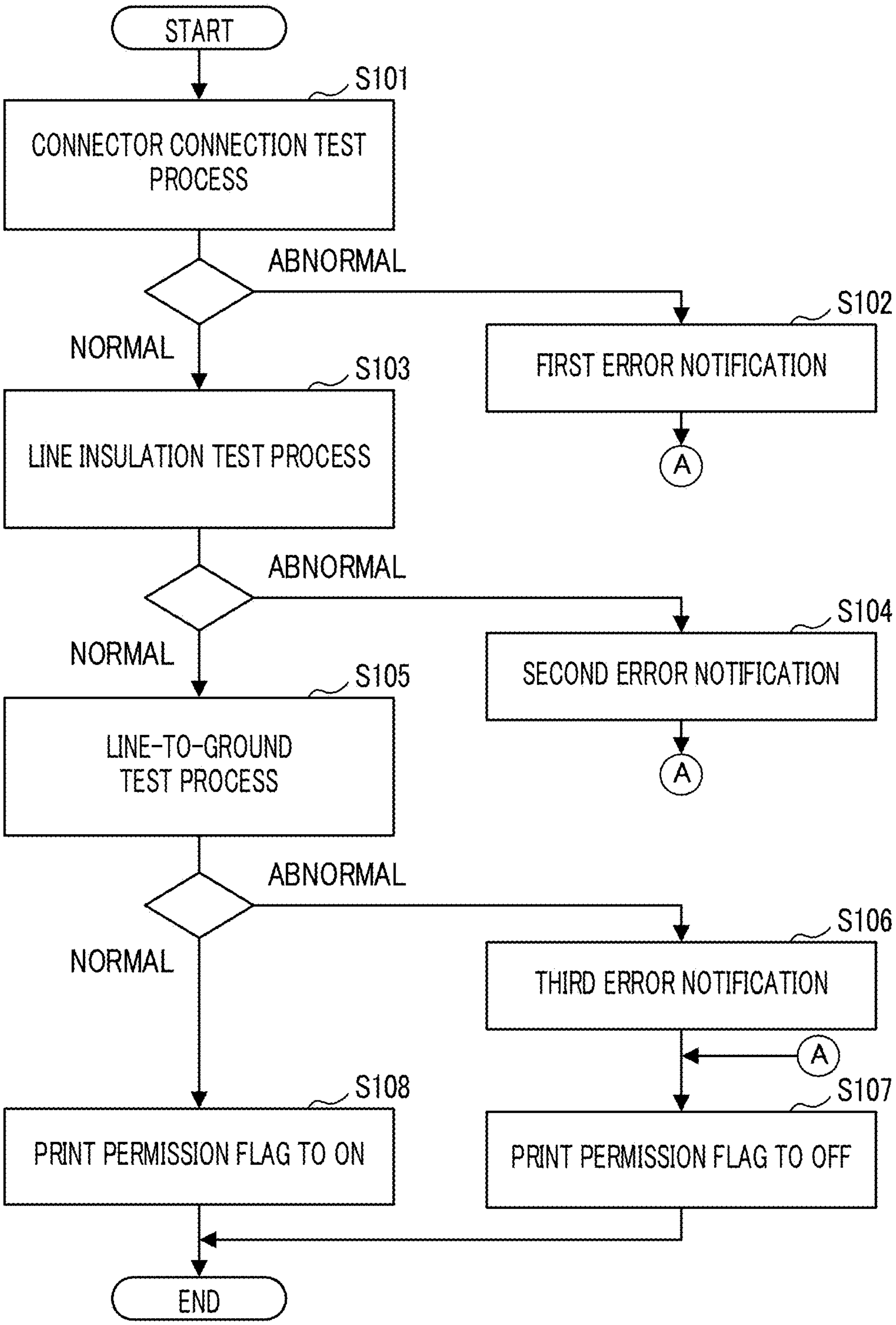
FIG. 5 is a flowchart showing an example of a procedure of a test process in the inkjet recording apparatus according to the first embodiment.

An example of the procedure of the test process will be described below with reference to the flowchart shown in FIG. 5.

In the following description, S101, S102, . . . represent identification codes of a plurality of steps in the test process. In the test process, step S101 is executed first.

<Step S101>

In step S101, the control circuit 43 executes the connector connection test process. The connector connection test process is a first example of a process for determining whether the electrical connection state is normal or abnormal (see FIG. 6).

The connector connection test process will be described in detail later. The control circuit 43 executes the process of step S102 in a case in which the connector connection test process determines that the electrical connection state is abnormal.

On the other hand, in a case in which the electrical connection state is determined to be normal by the connector connection test process, the control circuit 43 executes the process of step S103.

<Step S102>

In step S102, the control circuit 43 outputs a first error notification to the CPU 81.

The first error notification indicates that the electrical connection state has been determined to be abnormal by the connector connection test process.

When the main processing portion 8*a* of the CPU 81 receives the first error notification from the control circuit 43, the main processing portion 8*a* notifies the user of a first error message indicating the contents of the first error notification.

For example, the main processing portion 8*a* causes the display device 802 to display the first error message. Alternatively, the main processing portion 8*a* transmits the first error message to the host device via the communication device 85.

After executing the process of step S102, the control circuit 43 executes the process of step S107.

<Step S103>

In step S103, the control circuit 43 executes the line insulation test process. The line insulation test process is a second example of a process for determining whether the electrical connection state is normal or abnormal (see FIG. 7).

The line insulation test process will be described in detail later. In a case in which the line insulation test process determines that the electrical connection state is abnormal, the control circuit 43 executes the process of step S104.

On the other hand, in a case in which the line insulation test process determines that the electrical connection state is normal, the control circuit 43 executes the process of step S105.

<Step S104>

In step S104, the control circuit 43 outputs a second error notification to the CPU 81.

The second error notification indicates that the electrical connection state has been determined to be abnormal by the line insulation test process.

When the main processing portion 8*a* of the CPU 81 receives the second error notification from the control circuit 43, the main processing portion 8*a* notifies the user of a second error message indicating the content of the second error notification.

For example, the main processing portion 8*a* causes the display device 802 to display the second error message. Alternatively, the main processing portion 8*a* transmits the second error message to the host device via the communication device 85.

After executing the process of step S104, the control circuit 43 executes the process of step S107.

<Step S105>

In step S105, the control circuit 43 executes the line-to-ground fault test process. The line-to-ground fault test process is a third example of a process for determining whether the electrical connection state is normal or abnormal (see FIG. 8).

The line-to-ground fault test process will be described in detail later. In a case in which the line-to-ground fault test process determines that the electrical connection state is abnormal, the control circuit 43 executes the process of step S106.

On the other hand, in a case in which the line-to-ground fault test process determines that the electrical connection state is normal, the control circuit 43 executes the process of step S108.

<Step S106>

In step S106, the control circuit 43 outputs a third error notification to the CPU 81.

The third error notification indicates that the electrical connection state has been determined to be abnormal by the line-to-ground fault test process.

When the main processing portion 8*a* of the CPU 81 receives the third error notification from the control circuit 43, the main processing portion notifies the user of a third error message indicating the content of the third error notification.

For example, the main processing portion 8*a* causes the display device 802 to display the third error message. Alternatively, the main processing portion 8*a* transmits the third error message to the host device via the communication device 85.

After executing the process of step S106, the control circuit 43 executes the process of step S107.

<Step S107>

In step S107, the control circuit 43 sets the print permission flag to OFF.

The control circuit 43 executes the ink ejection control on the condition that the print permission flag is set to ON. Therefore, in a state in which the print permission flag is set to OFF, execution of the ink ejection control is not permitted.

After executing the process of step S107, the control circuit 43 ends the test process.

<Step S108>

In step S108, the control circuit 43 sets the print permission flag to ON.

In a state in which the print permission flag is set to ON, execution of the ink ejection control is permitted.

After executing the process of step S108, the control circuit 43 ends the test process. The state of the print permission flag is maintained even after the test process ends.

[Connector Connection Test Process]

Figure 6:
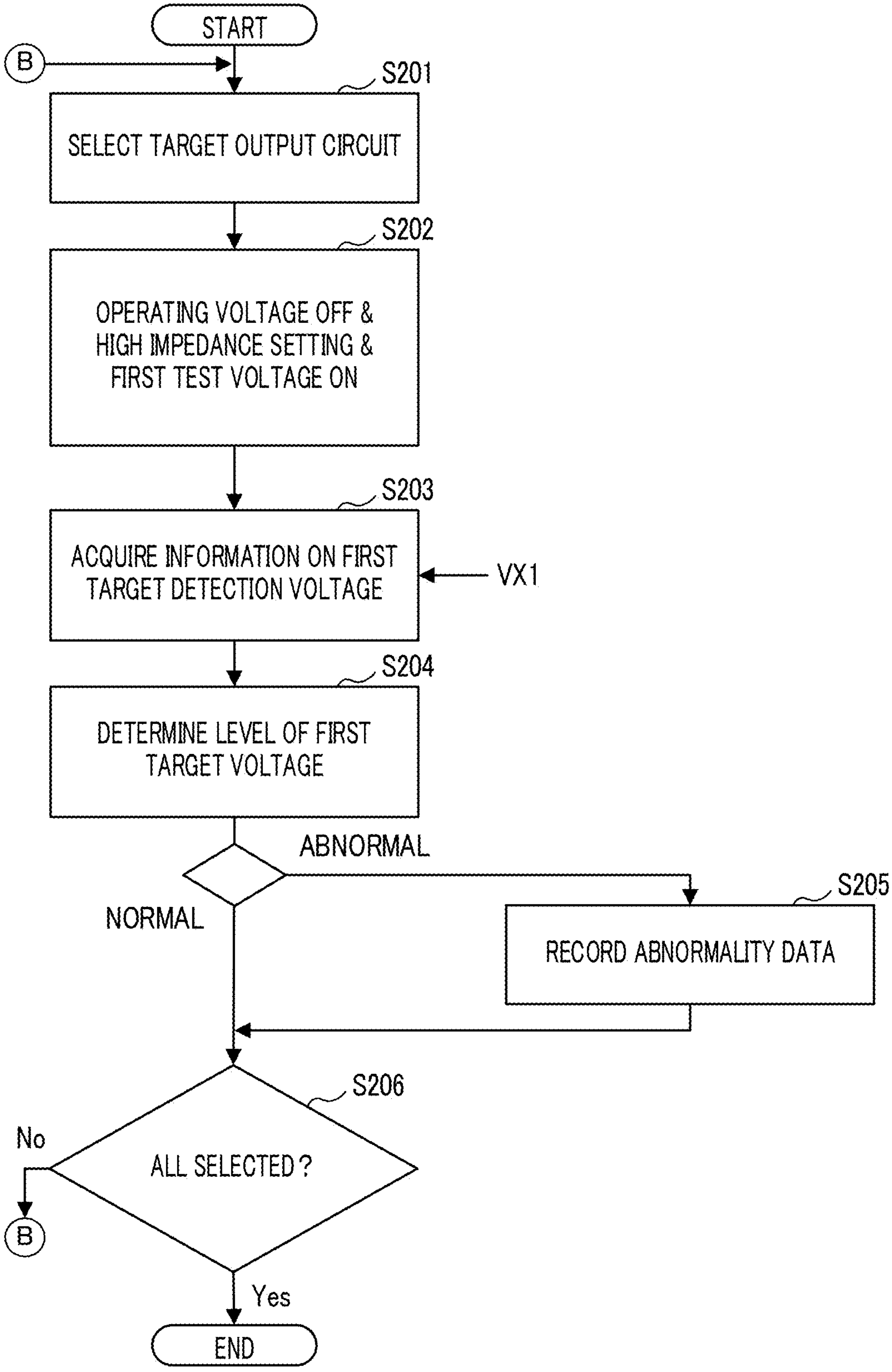
FIG. 6 is a flowchart showing an example of a procedure for a connector connection test process in the inkjet recording apparatus according to the first embodiment.

Next, an example of the procedure of the connector connection test process will be described with reference to the flowchart shown in FIG. 6.

In the following description, S201, S202, . . . represent identification codes of a plurality of steps in the connector connection test process. In the connector connection test process, step S201 is executed first.

<Step S201>

Figure 9:
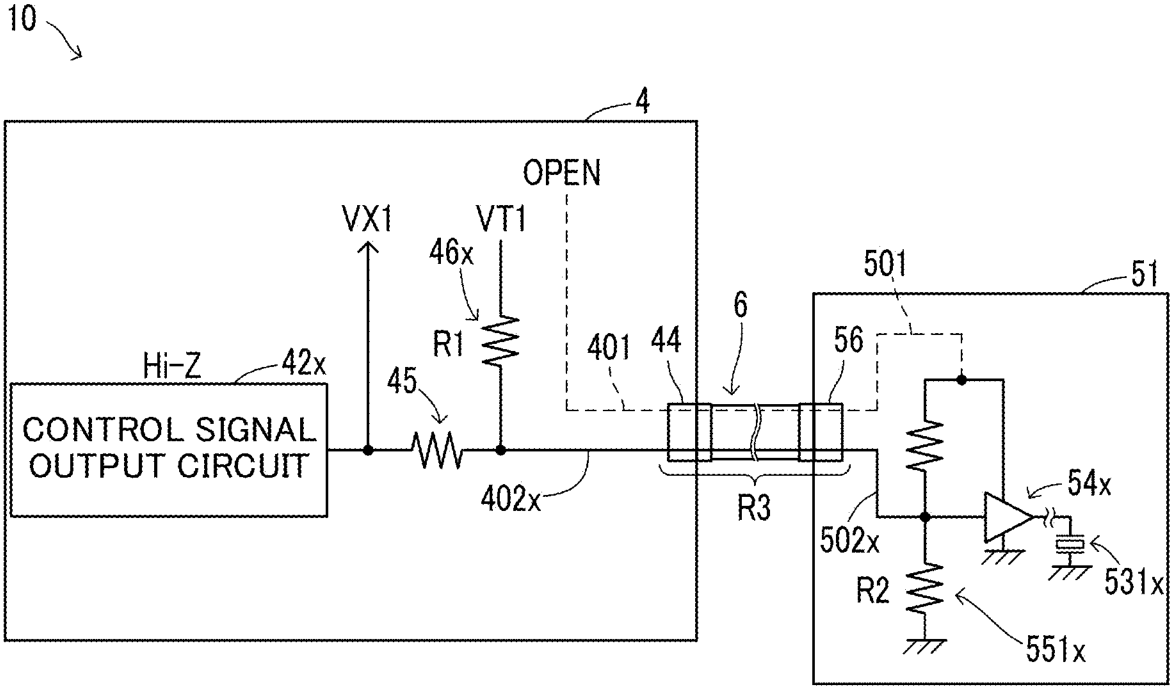
FIG. 9 is a diagram showing a configuration of a portion related to the connector connection test process in the inkjet recording apparatus according to the first embodiment.

In step S201, the control circuit 43 selects one of the plurality of control signal output circuits 42 as a target output circuit 42*x* (see FIG. 9). Each time the process of step S201 is executed, each of the control signal output circuits 42 is selected in sequence as a target output circuit 42*x*.

FIG. 9 shows a configuration of portions of the inkjet control device 4 and the inkjet unit 51 related to the connector connection test process.

In the following description, one of the plurality of first signal lines 402 that corresponds to the target output circuit 42*x* will be referred to as a target first signal line 402*x*. In addition, one of the plurality of test resistors 46 connected to the target first signal line 402*x* is referred to as a target test resistor 46*x*.

Moreover, one of the plurality of second signal lines 502 that corresponds to the target first signal line 402*x* is referred to as a target second signal line 502*x*. Further, one of the plurality of first termination resistors 551 corresponding to the target test resistor 46*x* is referred to as a target termination resistor 551*x*.

In addition, one of the plurality of voltage divider circuits including the target test resistor 46*x* and the target termination resistor 551*x* is referred to as a target voltage divider circuit.

After executing the process of step S201, the control circuit 43 executes the process of step S202.

<Step S202>

In step S202, the control circuit 43 controls the operating voltage output circuit 41 so as to be in an operating voltage OFF state, sets the target output circuit 42*x* to a high impedance state, and controls the test voltage output circuit 47 so as to be in a first test voltage ON state.

The operating voltage OFF state is a state in which the operating voltage output circuit 41 is not allowed to output the operating voltage VO1.

The target output circuit 42 x selectively switches between two states in accordance with a command from the control circuit 43. The two states include an active state, in which a signal having a level between a predetermined low level and a predetermined high level is output, and a high impedance state. The target output circuit 42*x* outputs a control signal SC1 in the active state.

In a case in which the target output circuit 42*x* is in the high impedance state, the current does not flow back to the target output circuit 42*x* via the target first signal line 402*x*.

The first test voltage ON state is a state in which a test voltage VT1 is supplied from the test voltage output circuit 47 to the target voltage divider circuit.

FIG. 9 shows the control state of step S202. The control state of step S202 is a first example of the test state. When executing the process of step S202, the control circuit 43 also executes the process of step S203.

<Step S203>

In step S203, the control circuit 43 acquires information on the first target detection voltage VX1 from the divided voltage detection circuit 48. The first target detection voltage VX1 is a voltage detected by the divided voltage detection circuit 48 for the target voltage divider circuit in the control state of step S202 (see FIG. 9).

After executing the process of step S203, the control circuit 43 executes the process of step S204.

<Step S204>

In step S204, the control circuit 43 determines whether the electrical connection state is normal or abnormal depending on the level of the first target detection voltage VX1.

In FIG. 9, a first voltage dividing resistance R1 is a resistance value of the target test resistor 46*x*, and a second voltage dividing resistance R2 is a resistance value of the target termination resistor 551*x*.

In FIG. 9, a target connection resistance R3 is a resistance value of a target signal line extending from the target first signal line 402*x* to the target second signal line 502*x*. Note that resistance value of each of the termination resistors 45 is negligibly small compared to the second voltage dividing resistance R2.

The first target detection voltage VX1 is a voltage obtained by dividing the test voltage VT1 by the first voltage dividing resistance R1, the target connection resistance R3, and the second voltage dividing resistance R2.

Figure 10:
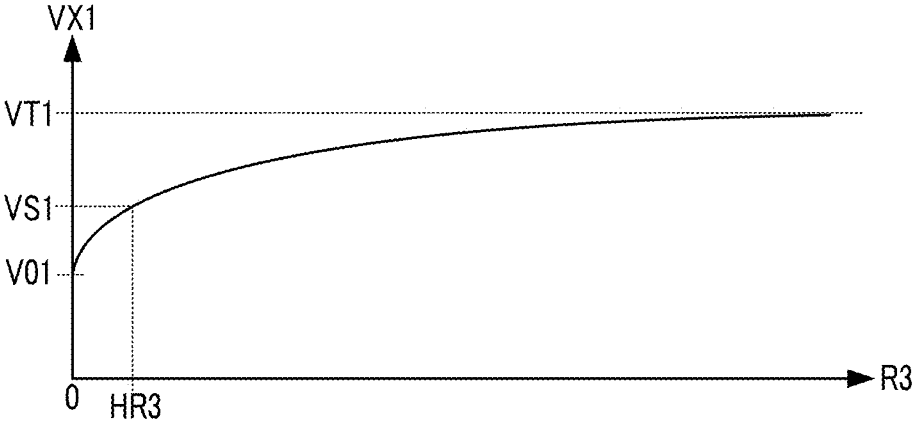
FIG. 10 is a graph showing a relationship between a target line resistance and a target detected voltage in the inkjet recording apparatus according to the first embodiment.

FIG. 10 is a graph showing a relationship between the target connection resistance R3 and the first target detection voltage VX1. As shown in FIG. 10, in a case in which the target connection resistance R3 is zero, the first target detection voltage VX1 is a reference voltage V01 determined by the test voltage VT1, the first voltage dividing resistance R1, and the second voltage dividing resistance R2.

As shown in FIG. 10, as the target connection resistance R3 increases from zero, the first target detection voltage VX1 gradually increases from the reference voltage V01 and approaches the test voltage VT1. In a case in which the connection state of the wire harness 6 is normal, the target connection resistance R3 is extremely small.

In FIG. 10, the allowable upper limit resistance HR3 is an upper limit of an allowable range of the target connection resistance R3. A threshold voltage VS1 is the first target detection voltage VX1 when the target connection resistance R3 is the allowable upper limit resistance HR3.

The control circuit 43 determines that the electrical connection state of the target signal line is normal in a case in which the level of the first target detection voltage VX1 is equal to or lower than the threshold voltage VS1. On the other hand, in a case in which the level of the first target detection voltage VX1 exceeds the threshold voltage VS1, the control circuit 43 determines that the electrical connection state of the target signal line is abnormal.

For example, the abnormality in the electrical connection state of the target signal line may occur when a non-conductive foreign object becomes caught in the terminal of the first connector 44 or the second connector 56.

When it is determined that the electrical connection state of the target signal line is abnormal, the control circuit 43 executes the process of step S205. On the other hand, when it is determined that the electrical connection state of the target signal line is normal, the control circuit 43 executes the process of step S206.

<Step S205>

In step S205, the control circuit 43, in a predetermined storage device, records abnormality data indicating that the electrical connection state of the target signal line is abnormal.

After executing the process of step S205, the control circuit 43 executes the process of step S206.

<Step S206>

In step S206, the control circuit 43 determines whether or not the selection of the target output circuit 42*x* in step S201 has been performed for all the control signal output circuits 42.

In a case in which the control circuit 43 determines that the selection of the target output circuit 42*x* has not yet been performed for all of the control signal output circuits 42, the control circuit 43 repeats the processes from step S201 onwards. Thus, a new target output circuit 42*x* is selected, and the processes from step S202 onwards corresponding to the new target output circuit 42*x* are executed.

That is, the control circuit 43 executes the processes of steps S202 to S205 on each of the plurality of control signal output circuits 42 as a target output circuit 42*x*.

On the other hand, in a case in which the control circuit 43 determines that the selection of the target output circuit 42*x* has been performed for all the control signal output circuits 42, the control circuit 43 ends the connector connection test process.

When the connector connection test process is completed, the presence or absence of the recorded abnormality data indicates whether the electrical connection state has been determined to be normal or abnormal. In addition, the content of the abnormality data indicates the content of the abnormality in the electrical connection state determined in the connector connection test process.

[Line Insulation Test Process]

Figure 7:
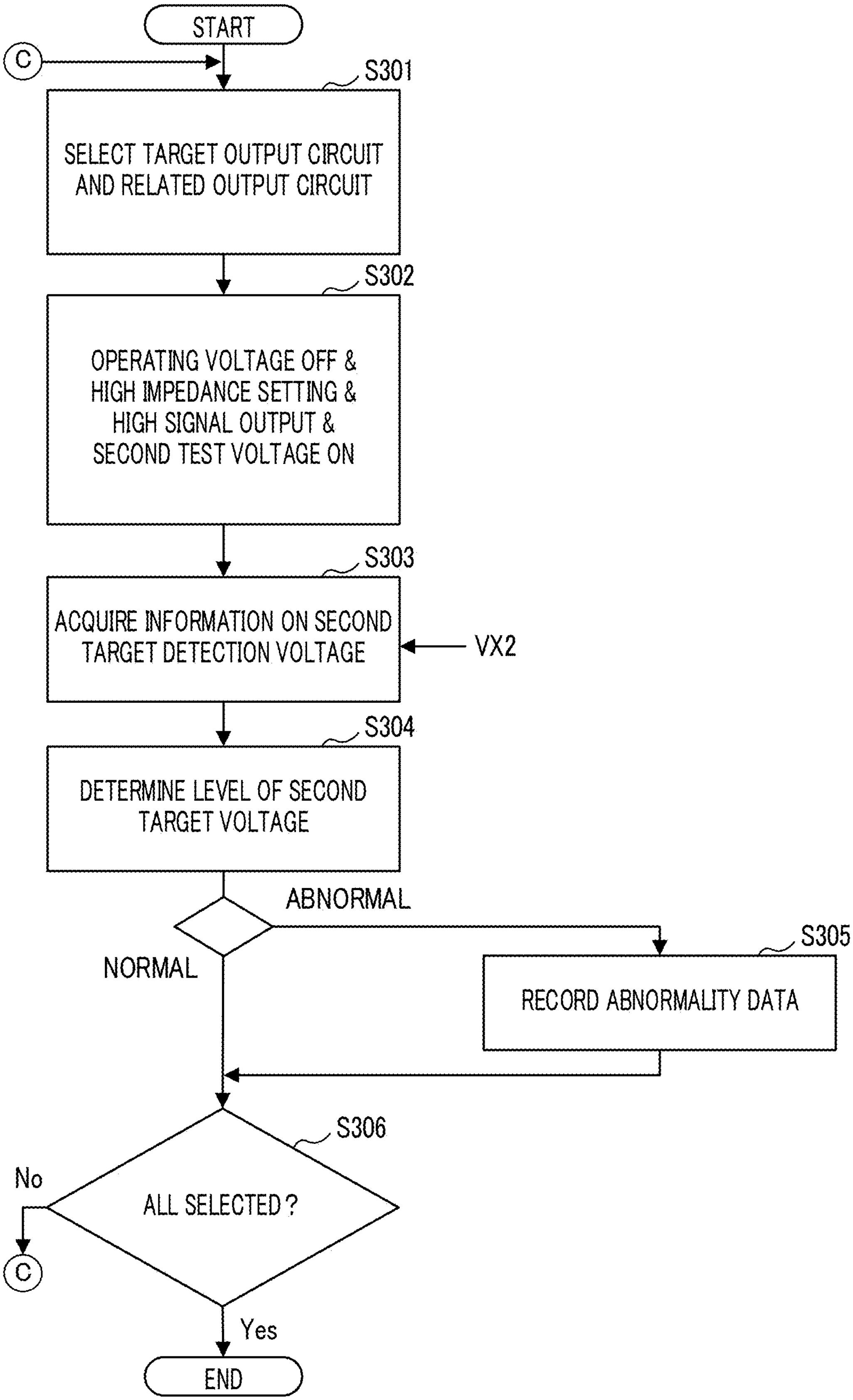
FIG. 7 is a flowchart showing an example of a procedure of a line insulation test process in the inkjet recording apparatus according to the first embodiment.

Next, an example of the procedure of the line insulation test process will be described with reference to the flowchart shown in FIG. 7.

In the following description, S301, S302, . . . represent identification codes of a plurality of steps in the line insulation test process. In the line insulation test process, step S301 is executed first.

<Step S301>

Figure 11:
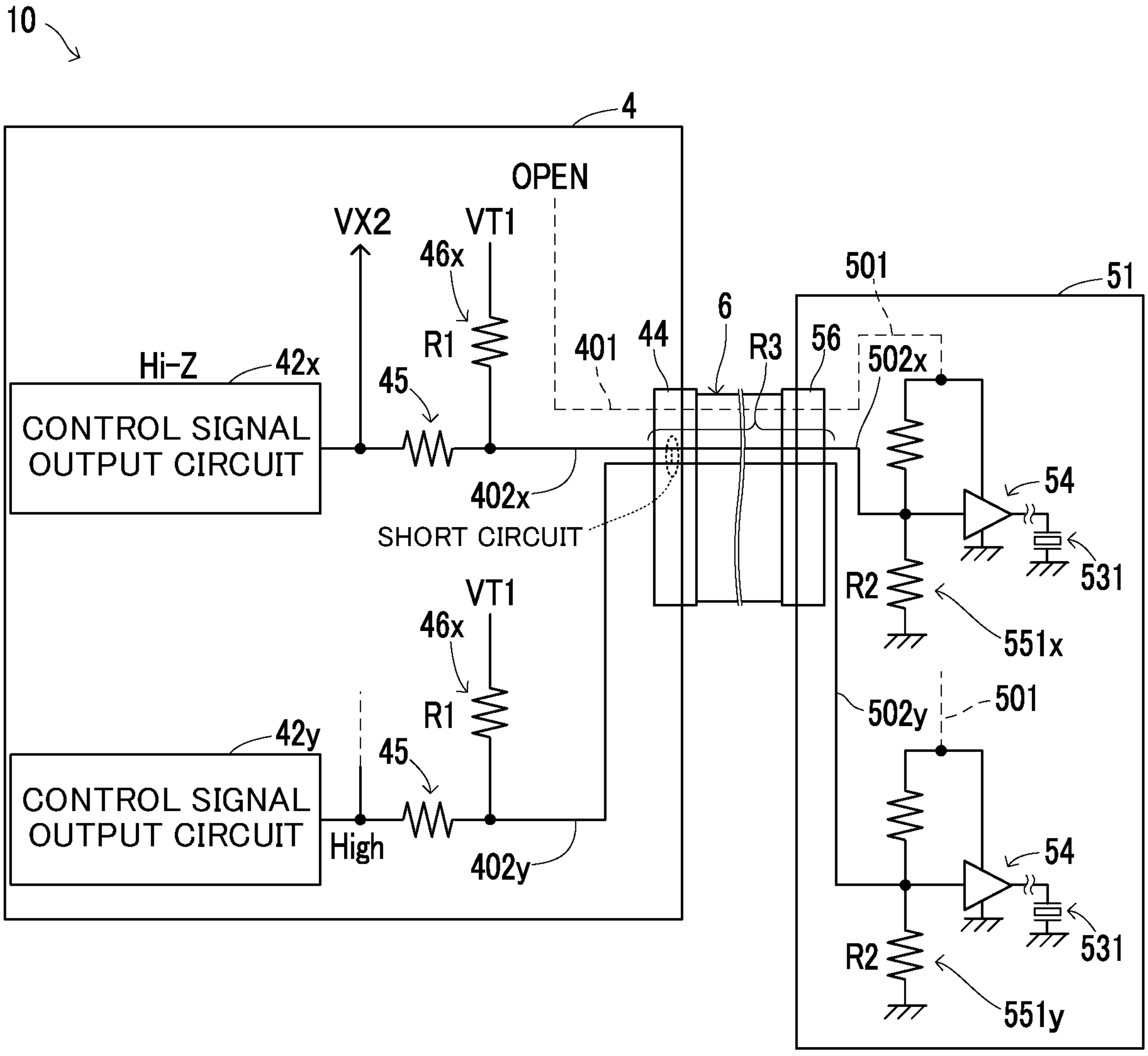
FIG. 11 is a diagram showing a configuration of a portion related to the line insulation test process in the inkjet recording apparatus according to the first embodiment.

In step S301, the control circuit 43 selects two of the plurality of control signal output circuits 42 as a target output circuit 42*x* and a related output circuit 42*y* (see FIG. 11).

Each time the process of step S201 is executed, each of the control signal output circuits 42 is selected in sequence as a target output circuit 42*x*. Here, one of the plurality of first terminals 44*a* that is electrically connected to the target output circuit 42*x* is referred to as a target terminal.

The related output circuit 42*y* is one of the plurality of control signal output circuits 42 that is electrically connected to a nearby terminal that is arranged in a predetermined vicinity range with respect to the target terminal among the plurality of first terminals 44*a*. For example, the nearby terminal is a terminal adjacent to the target terminal.

FIG. 11 shows a configuration of the inkjet control device 4 and a portion of the inkjet unit 51 that is related to the line insulation test process.

In the following description, one of the plurality of first signal lines 402 that corresponds to the related output circuit 42*y* will be referred to as a related first signal line 402*y*. In addition, one of the plurality of second signal lines 502 that corresponds to the related first signal line 402*y* is referred to as a related second signal line 502*y*.

Moreover, one of the plurality of test resistors 46 connected to the related first signal line 402*y* is referred to as a related test resistor 46*y*. Furthermore, one of the plurality of first termination resistors 551 corresponding to the related test resistor 46*y* is referred to as a related termination resistor 551*y*.

In addition, one of the plurality of voltage divider circuits including a related test resistor 46*y* and a related termination resistor 551*y* is referred to as a related voltage divider circuit.

After executing the process of step S301, the control circuit 43 executes the process of step S302.

<Step S302>

In step S302, the control circuit 43 controls the operating voltage output circuit 41 so as to be in the operating voltage OFF state, sets the target output circuit 42*x* to the high impedance state, causes the related output circuit 42*y* to output a high level signal, and controls the test voltage output circuit 47 so as to be in the second test voltage ON state.

The second test voltage ON state is a state in which the test voltage VT1 is supplied from the test voltage output circuit 47 to the target voltage divider circuit and the related voltage divider circuit.

FIG. 11 shows the control state of step S302. The control state of step S302 is a second example of the test state. When executing the process of step S302, the control circuit 43 also executes the process of step S303.

<Step S303>

In step S303, the control circuit 43 acquires information on the second target detection voltage VX2 from the divided voltage detection circuit. The second target detection voltage VX2 is a voltage detected by the voltage division detection circuit 48 for the target voltage divider circuit in the control state of step S302 (see FIG. 11).

After executing the process of step S303, the control circuit 43 executes the process of step S304

<Step S304>

In step S304, the control circuit 43 determines whether the electrical connection state is normal or abnormal depending on the level of the second target detection voltage VX2.

Generally, the second target detection voltage VX2, like the first target detection voltage VX1, is a voltage obtained by dividing the test voltage VT1 by the first voltage dividing resistance R1, the target connection resistance R3, and the second voltage dividing resistance R2.

However, there may be a case in which a line-to-line short circuit occurs in which the target signal line is short-circuited with the related signal line extending from the related first signal line 402*y* to the related second signal line 502*y*. The target signal line is a signal line extending from the target first signal line 402*x* to the target second signal line 502*x*.

For example, the line-to-line short circuit may occur when a conductive foreign object becomes caught in the terminal of the first connector 44 or the second connector 56.

In a case in which the line-to-line short circuit occurs, a voltage equivalent to that of the high-level signal output from the related output circuit 42*y* is detected as the second target detection voltage VX2. That is, in a case in which the line-to-line short circuit occurs, the second target detection voltage VX2 is higher than the threshold voltage VS1.

The control circuit 43 determines that the electrical connection state is normal in a case in which the level of the second target detection voltage VX2 is equal to or lower than the threshold voltage VS1. On the other hand, in a case in which the level of the second target detection voltage VX2 exceeds the threshold voltage VS1, the control circuit 43 determines that the electrical connection state is abnormal.

The electrical connection state determined in step S304 is a state that indicates whether or not sufficient electrical insulation is ensured between the target signal line and the related signal line.

When it is determined in step S304 that the electrical connection state is abnormal, the control circuit 43 executes the process of step S305. On the other hand, when it is determined in step S304 that the electrical connection state is normal, the control circuit 43 executes the process of step S306.

<Step S305>

In step S305, the control circuit 43, in a predetermined storage device, records abnormality data indicating that the electrical connection state in step S304 is abnormal.

After executing the process of step S305, the control circuit 43 executes the process of step S306.

<Step S306>

In step S306, the control circuit 43 determines whether or not the selection of the target output circuit 42*x* and the related output circuit 42*y* in step S201 has been performed for all predetermined selection candidates.

In a case in which the control circuit 43 determines that the selection of the target output circuit 42*x* and the related output circuit 42*y* has not yet been performed for all selection candidates, the control circuit 43 repeats the processes from step S301 onwards. Thus, a new combination of the target output circuit 42*x* and the related output circuit 42*y* is selected, and the processes from step S302 onwards corresponding to the new combination are executed.

That is, the control circuit 43 executes the processes of steps S302 to S305 on each of the plurality of control signal output circuits 42 as a target output circuit 42*x*.

On the other hand, in a case in which the control circuit 43 determines that the selection of the target output circuit 42*x* and the related output circuit 42*y* has been performed for all selection candidates, the control circuit 43 ends the line insulation test process.

When the line insulation test process is completed, the presence or absence of recorded abnormality data indicates whether the electrical connection state has been determined to be normal or abnormal. In addition, the content of the abnormality data indicates the content of the abnormality in the electrical connection state determined in the line insulation test process.

[Line-to-Ground Fault Test Process]

Figure 8:
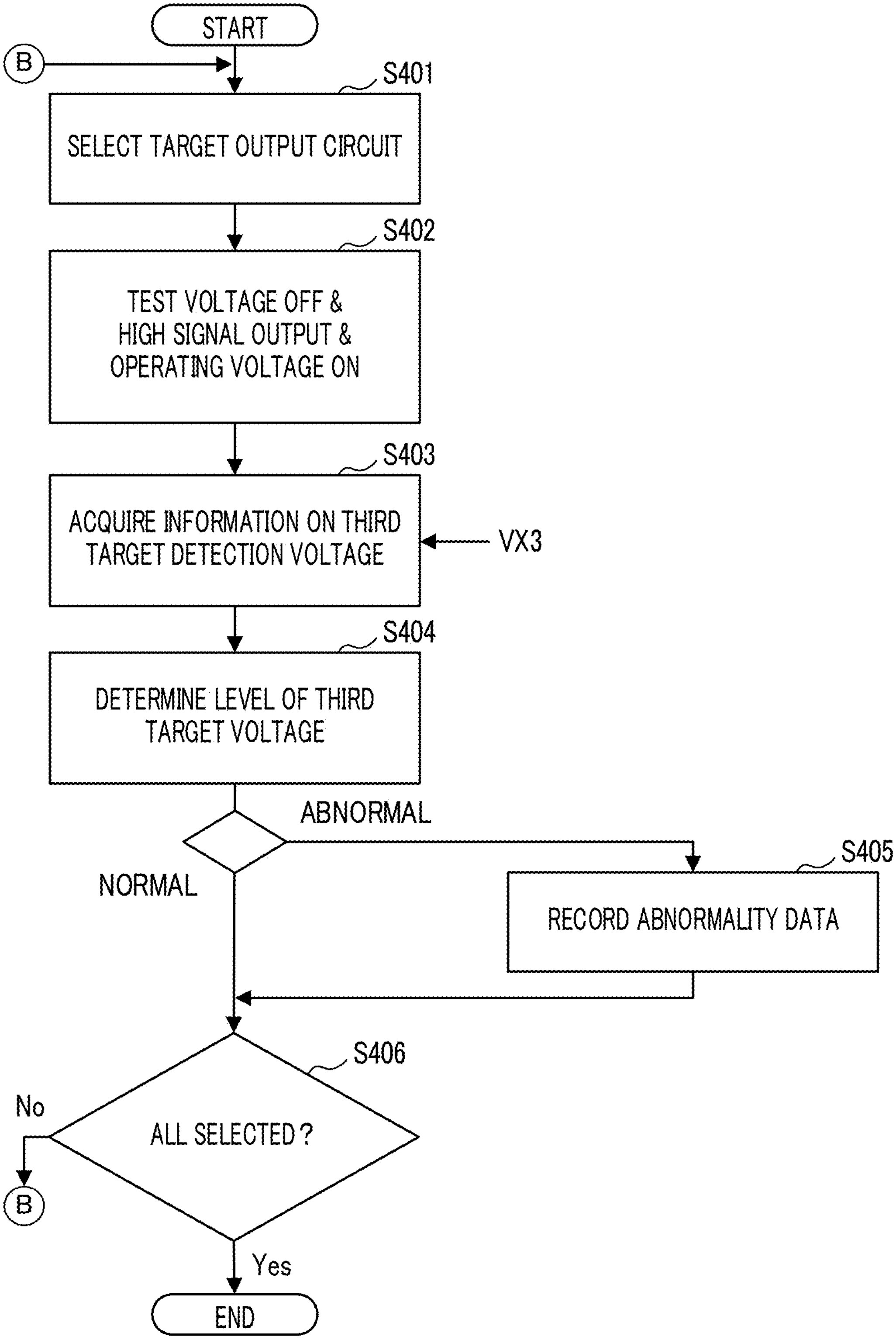
FIG. 8 is a flowchart showing an example of a procedure of a line-to-ground fault test process in the inkjet recording apparatus according to the first embodiment.

Next, an example of the procedure of the line-to-ground fault test process will be described with reference to the flowchart shown in FIG. 8.

In the following description, S301, S302, . . . represent identification codes of a plurality of steps in the line-to-ground fault test process. In the line-to-ground fault test process, step S401 is executed first.

<Step S401>

Figure 12:
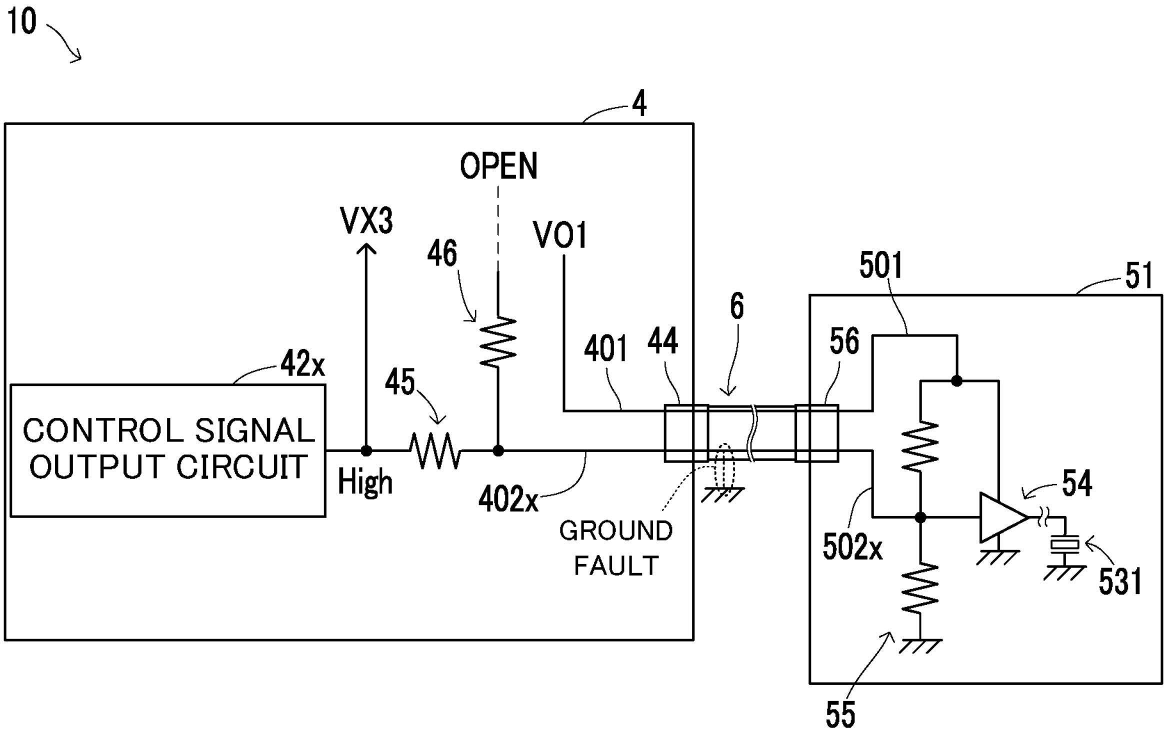
FIG. 12 is a diagram showing a configuration of a portion related to the line-to-ground fault test process in the inkjet recording apparatus according to the first embodiment.

In step S401, the control circuit 43 selects one of the plurality of control signal output circuits 42 as a target output circuit 42*x* (see FIG. 12). Each time the process of step S401 is executed, each of the control signal output circuits 42 is selected in sequence as a target output circuit 42*x*.

FIG. 12 shows a configuration of portions of the inkjet control device 4 and the inkjet unit 51 that are related to the line-to-ground fault test process.

After executing the process of step S401, the control circuit 43 executes the process of step S402.

<Step S402>

In step S402, the control circuit 43 controls the test voltage output circuit 47 so as to be in a test voltage OFF state, causes the target output circuit 42*x* to output a high level signal, and controls the operating voltage output circuit 41 so as to be in an operating voltage ON state.

The test voltage OFF state is a state in which the test voltage output circuit 47 is not allowed to output the test voltage VT1.

The operating voltage ON state is a state in which the operating voltage output circuit 41 outputs the operating voltage VO1. In the operating voltage ON state, the operating voltage VO1 is supplied to the first voltage line 401.

FIG. 12 shows the control state of step S402. The control state of step S402 is a third example of the test state. When executing the process of step S402, the control circuit 43 also executes the process of step S403.

<Step S403>

In step S403, the control circuit 43 acquires information on a third target detection voltage VX3 from the divided voltage detection circuit. The third target detection voltage VX3 is a detection voltage of the divided voltage detection circuit 48 for the target voltage dividing circuit in the control state of step S402 (see FIG. 12).

After executing the process of step S403, the control circuit 43 executes the process of step S404.

<Step S404>

In step S404, the control circuit 43 determines whether the electrical connection state is normal or abnormal according to the level of the third target detection voltage VX3.

Generally, the third target detection voltage VX3 is a voltage equivalent to the voltage of the high-level signal output from the target output circuit 42*x*.

However, in a case in which the target signal line has a ground fault, a voltage level close to the ground potential is detected as the third target detection voltage VX3. Here, the allowable lower limit of the voltage level of the high-level signal is referred to as a high-level lower limit.

The control circuit 43 determines that the electrical connection state of the target signal line is normal in a case in which the level of the third target detection voltage VX3 is equal to or higher than the high-level lower limit. On the other hand, in a case in which the level of the third target detection voltage VX3 falls below the high-level lower limit, the control circuit 43 determines that the electrical connection state of the target signal line is abnormal.

The electrical connection state determined in step S404 is a state that indicates whether or not sufficient electrical insulation is ensured between the target signal line and the ground portion.

For example, a ground fault in the target signal line may occur when a conductive foreign object becomes caught in the terminal of the first connector 44 or the second connector 56.

When it is determined in step S404 that the electrical connection state is abnormal, the control circuit 43 executes the process of step S405. On the other hand, when it is determined in step S404 that the electrical connection state is normal, the control circuit 43 executes the process of step S406.

<Step S405>

In step S405, the control circuit 43, in a predetermined storage device, records abnormality data indicating that the electrical connection state in step S404 is abnormal.

After executing the process of step S405, the control circuit 43 executes the process of step S406.

<Step S406>

In step S406, the control circuit 43 determines whether or not the selection of the target output circuit 42*x* in step S201 has been performed for all the control signal output circuits 42.

In a case in which the control circuit 43 determines that the selection of the target output circuit 42*x* has not yet been performed for all of the control signal output circuits 42, the control circuit 43 repeats the processes from step S401 onwards. Thus, a new target output circuit 42*x* is selected, and the processes from step S402 onwards corresponding to the new target output circuit 42*x* are executed.

That is, the control circuit 43 executes the processes of steps S402 to S405 on each of the plurality of control signal output circuits 42 as a target output circuit 42*x*.

On the other hand, in a case in which the control circuit 43 determines that the selection of the target output circuit 42*x* has been performed for all the control signal output circuits 42, the control circuit 43 ends the line-to-ground fault test process.

When the line-to-ground fault test process is completed, the presence or absence of the recorded abnormality data indicates whether the electrical connection state is determined to be normal or abnormal. In addition, the content of the abnormality data indicates the content of the abnormality in the electrical connection state determined in the line-to-ground fault test process.

By employing the inkjet recording apparatus 10, it is possible to detect electrical connection failures in some of the signal lines between the inkjet control device 4 and the inkjet unit 51 and the wire harness 6.

Second Embodiment

Next, an inkjet recording apparatus 10A according to a second embodiment will be described with reference to FIGS. 13 and 14. The inkjet recording apparatus 10A is a modification of the inkjet recording apparatus 10.

Figure 13:
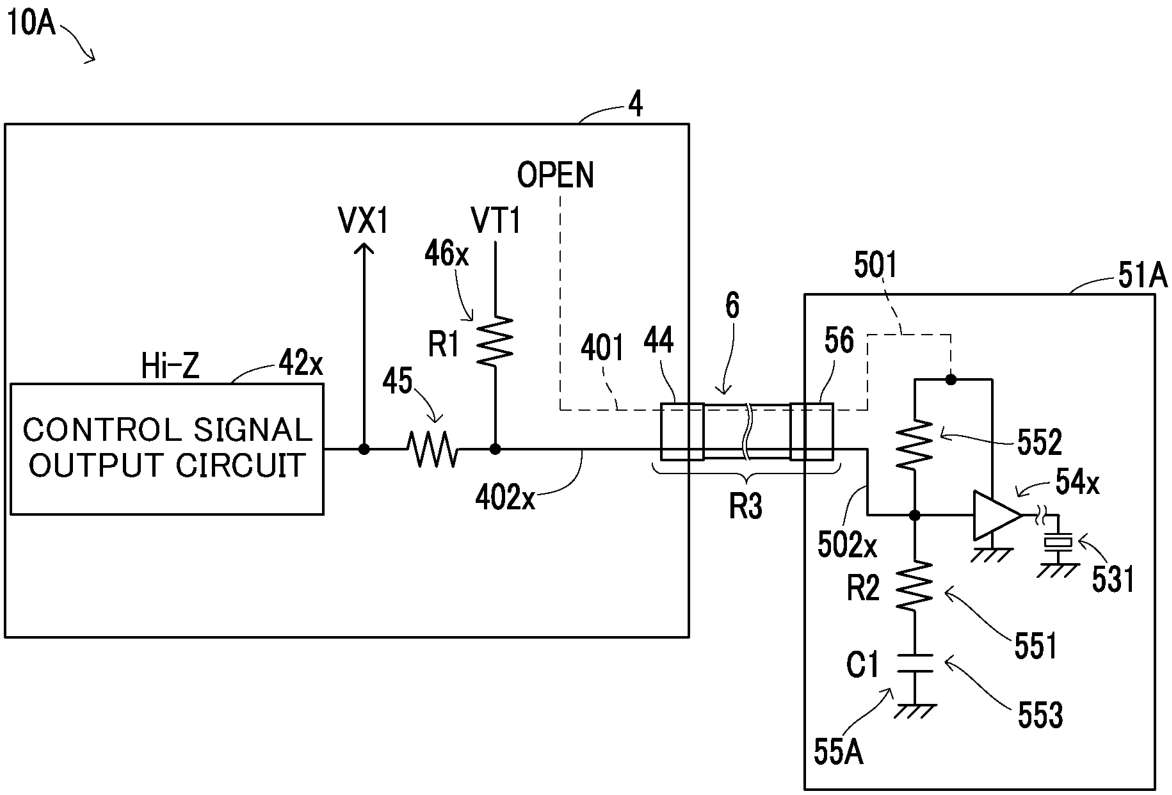
FIG. 13 is a diagram showing a configuration of a portion related to the connector connection test process in an inkjet recording apparatus according to a second embodiment.

In FIG. 13, the same components as the components shown in FIGS. 1 to 4 and 9 are designated by the same reference numerals. The differences between the inkjet recording apparatus 10A and the inkjet recording apparatus 10 will be described below.

The inkjet recording apparatus 10A includes a plurality of inkjet units 51A instead of the plurality of inkjet units 51. Instead of the plurality of termination circuits 55, each inkjet unit 51A includes a plurality of terminating circuits 55A.

Each of the terminating circuits 55A has a configuration in which a capacitor 553 is added to each of the terminating circuits 55. That is, the inkjet unit 51A includes a plurality of capacitors 553 connected in series with a plurality of first termination resistors 551, respectively.

Each of the capacitors 553 is provided in order to reduce the power consumption of each of the terminating circuits 55A.

FIG. 13 shows a configuration of the inkjet control device 4 and a portion of the inkjet unit 51A that is related to the connector connection test process. FIG. 13 shows the control state of step S202 when the inkjet unit 51A is employed.

Figure 14:
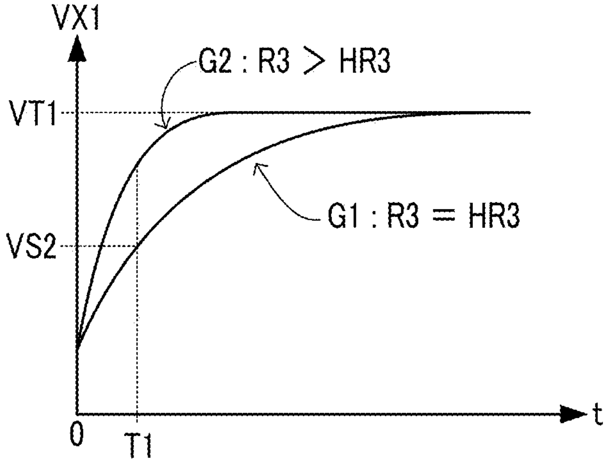
FIG. 14 is a graph showing a relationship between a first target detection voltage and an elapsed time from the start of output of a test voltage in the inkjet recording apparatus according to the second embodiment.

The graph in FIG. 14 shows the relationship between the test voltage output time and the first target detection voltage VX1 when the inkjet recording apparatus 10A is in the control state of step S202. The test voltage output time is the time elapsed from the start of output of the test voltage VT1.

In FIG. 14, a first graph G1 shows a change in the first target detection voltage VX1 when the target connection resistance R3 is the allowable upper limit resistance HR3. A second graph G2 shows the change in the first target detection voltage VX1 in a case in which the target connection resistance R3 is greater than the allowable upper limit resistance HR3.

As shown in FIG. 14, in a case in which a capacitor 553 is connected to the target voltage dividing circuit, the first target detection voltage VX1 gradually increases to the test voltage VT1 as the test voltage output time elapses.

In addition, in a case in which the target connection resistance R3 is large, the rate at which the first target detection voltage VX1 rises is faster than in a case in which the target connection resistance R3 is small.

In the present embodiment, in step S203, the control circuit 43 acquires information on the first target detection voltage VX1 at a specific point in time T1, which is a predetermined time after a point in time at which the test voltage VT1 is output to the target voltage dividing circuit (see FIG. 14).

Furthermore, in step S204, the control circuit 43 determines whether the electrical connection state is normal or abnormal depending on the level of the first target detection voltage VX1 at the specific point in time T1.

More specifically, the control circuit 43 determines that the electrical connection state is normal in a case in which the level of the first target detection voltage VX1 at the specific point in time T1 is equal to or lower than the threshold voltage VS2. On the other hand, in a case in which the level of the first target detection voltage VX1 at the specific point in time T1 exceeds the threshold voltage VS2, the control circuit 43 determines that the electrical connection state is normal.

For example, the threshold voltage VS2 is the first target detection voltage VX1 at the specific point in time T1 when the target connection resistance R3 is the allowable upper limit resistance HR3.

Similarly, in the present embodiment, in step S303, the control circuit 43 acquires information on the second target detection voltage VX2 at a specific point in timeT1, which is a predetermined time after a point in time at which the test voltage VT1 is output to the target voltage divider circuit and the related voltage divider circuit.

Furthermore, in step S304, the control circuit 43 determines whether the electrical connection state is normal or abnormal depending on the level of the second target detection voltage VX2 at the specific time point T1.

In a case in which the second embodiment is adopted, the same effects as in a case in which the first embodiment is adopted can be obtained.

Third Embodiment

Next, an inkjet recording apparatus 10B according to a third embodiment will be described with reference to FIG. 15. The inkjet recording apparatus 10B is a modification of the inkjet recording apparatus 10.

Figure 15:
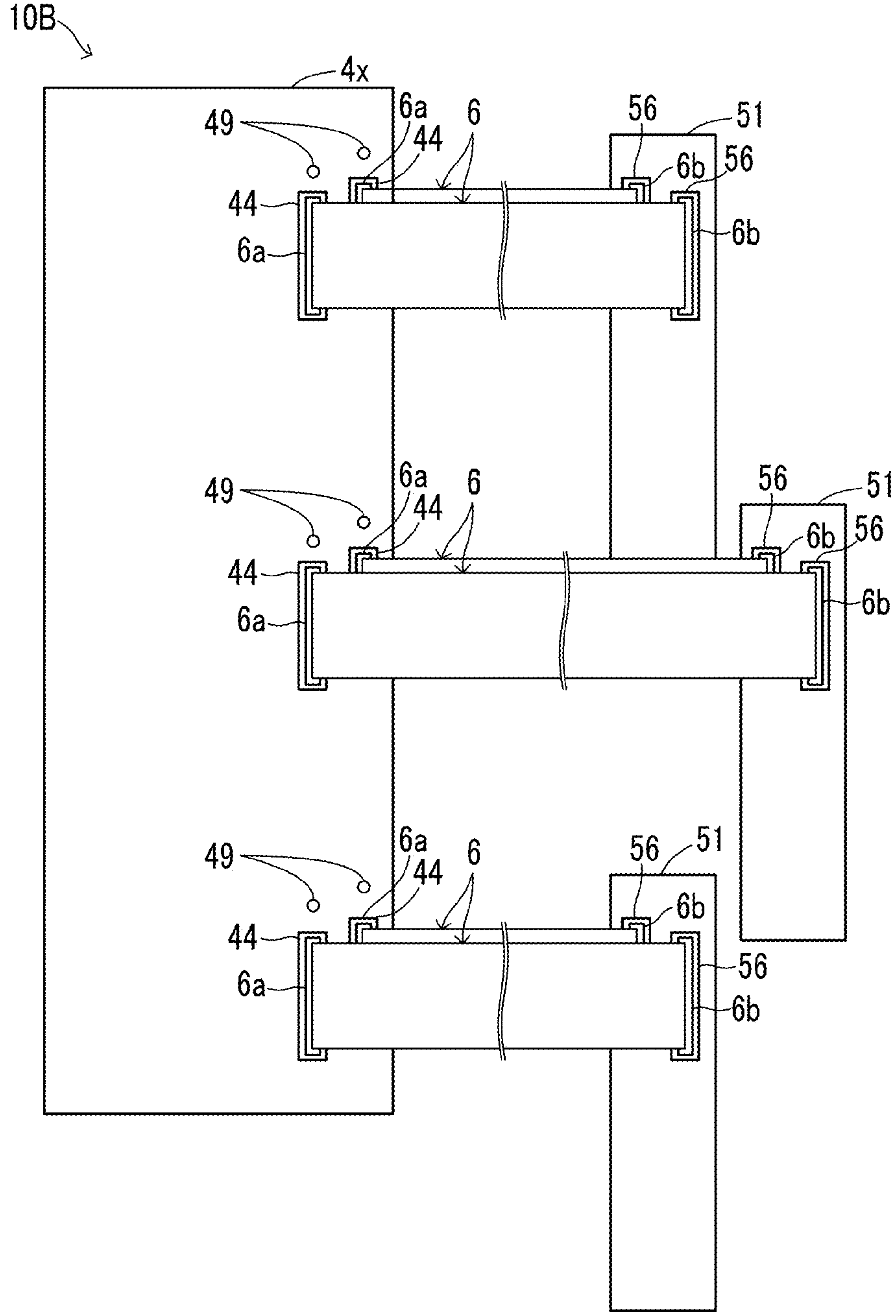
FIG. 15 is a connection diagram of a control device and a plurality of inkjet units in an inkjet recording apparatus according to a third embodiment.

In FIG. 15, the same components as the components shown in FIGS. 1 to 4 and 9 are designated by the same reference numerals. The differences between the inkjet recording apparatus 10B and the inkjet recording apparatus 10 will be described below.

The inkjet recording apparatus 10B includes a control device 4*x* instead of the control device 4. The control device 4*x* has a configuration in which one or more display portions 49 are added to the control device 4. The display portions 49 are arranged in correspondence with the first connectors 44.

In the example shown in FIG. 15, the control device 4*x* is electrically connected to a plurality of inkjet units 51 by a plurality of wire harnesses 6. In this case, the control device 4*x* includes a plurality of first connectors 44 corresponding to a plurality of wire harnesses 6.

In the example shown in FIG. 15, the control device 4*x* includes a plurality of display portions 49 arranged corresponding to the plurality of first connectors 44, respectively. Each display portion 49 is capable of distinguishing and displaying at least two types of states.

In the present embodiment, each display portion 49 is a light emitting diode (LED). For example, the LED is capable of distinguishing and displaying two different states by being ON or OFF. In addition, the LED is capable of distinguishing and displaying two different states by lighting or flashing. Moreover, each display portion 49 may be a two-color LED capable of emitting light of two colors.

The control circuit 43 controls the output state of a lighting signal to each display portion 49. The control circuit 43, by controlling the lighting signal, controls each display portion 49 so as to be in a display state that indicates the determination result of the electrical connection state by the test process.

Here, one or more connectors of the plurality of first connectors 44 for which a determination result that the electrical connection state is abnormal are referred to as abnormal connectors. In addition, one or more of the first connectors 44 for which the determination result of the electrical connection state is not abnormal are referred to as normal connectors.

For example, the control circuit 43 controls one or more first display portions of the plurality of display portions 49 that correspond to the normal connectors so as to be in a first display state. On the other hand, the control circuit 43 controls one or more second display portions of the plurality of display sections 49 that correspond to the abnormal connectors so as to be in a second display state.

For example, the first display state is a lighting OFF state, and the second display state is a lighting ON state. In addition, the first display state is a continuous lighting state, and the second display state is a flashing state. Moreover, the first display state is a state in which lighting is in a first color, and the second display state is a state in which lighting is in a second color.

In step S108 of the test process, the control circuit 43 controls the first display portion so as to be in the first display state.

On the other hand, the control circuit 43 controls the second display portion so as to be in the second display state as the first error notification in step S102, the second error notification in step S104, and the third error notification in step S106 in the test process.

In addition, the control circuit 43 may control the second display portion so as to be in a display state according to the type of abnormality in the electrical connection state. That is, the control circuit 43 may control the second display portion to have different display states for the first error notification, the second error notification, and the third error notification, respectively.

For example, the control circuit 43 causes the second display portion to flash in different flashing patterns for the first error notification, the second error notification, and the third error notification.

Note that each display portion 49 may be a seven-segment LED capable of displaying numerical values. In this case, the control circuit 43 causes the second display portion to display different numerical values for the first error notification, the second error notification, and the third error notification, respectively.

Even in a case in which the present embodiment is adopted, the same effects as in a case in which the first embodiment is adopted can be obtained. By adopting the present embodiment, it is easy for the control device 4B to identify the normal connector and the abnormal connector. In addition, the present embodiment may be applied to the second embodiment.

[Supplementary Notes]

Hereinafter, an outline of the disclosure extracted from the above-described embodiments will be added. Note that the configurations and processing functions described in the following supplementary notes may be selected and combined as desired.

<Supplementary Note 1>

An inkjet recording apparatus, including a control device and an inkjet unit connected by a wire harness; wherein the control device includes:

an operating voltage output circuit capable of outputting an operating voltage;

a plurality of control signal output circuits each capable of outputting a plurality of control signals; and a first connector including a plurality of first terminals connected to a first voltage line that transmit an operating voltage and a plurality of first signal lines that transmit the plurality of control signals, the first connector being connected to a first end portion of the wire harness;

the inkjet unit includes:

a second connector including a plurality of second terminals and connected to a second end portion of the wire harness;

a plurality of receiving circuits each supplied with the operating voltage and the plurality of control signals via a second voltage line and a plurality of second signal lines connected to the plurality of second terminals;

a plurality of termination resistors respectively connected to the plurality of second signal lines;

a plurality of piezoelectric elements each supplied with a plurality of drive signals corresponding to the plurality of control signals received by the plurality of receiving circuits; and a plurality of nozzles configured to eject ink pressurized by the plurality of piezoelectric elements;

the control device further includes:

a test voltage output circuit capable of outputting a test voltage;

a plurality of test resistors to which the test voltage is supplied from the test voltage output circuit, and which, together with the plurality of termination resistors, constitute a plurality of voltage dividing circuits;

a divided voltage detection circuit configured to detect an output voltage of each of the plurality of voltage dividing circuits; and a control circuit configured to control the operating voltage output circuit, the plurality of control signal output circuits and the test voltage output circuit;

the control circuit executes a test process of controlling the operating voltage output circuit, the plurality of control signal output circuits, and the test voltage output circuit so as to be in a test state, and determining, according to a detection result of the divided voltage detection circuit in the test state, whether an electrical connection state between the plurality of first terminals and the plurality of second terminals is normal or abnormal; and the control circuit, after determining by the test process that the electrical connection state is normal, further executes ink ejection control by causing the operating voltage output circuit to output the operating voltage, while causing some or all of the plurality of control signal output circuits to output some or all of the plurality of control signals.

<Supplementary Note 2>

The inkjet recording apparatus according to Supplementary Note 1, wherein the test process includes a connector connection test process; and the connector connection test process includes:

a process in which the control circuit, together with not causing the operating voltage output circuit to output the operating voltage, and setting each of the plurality of control signal output circuits to a high impedance state, causes the test voltage output circuit to output the test voltage to each of the plurality of voltage dividing circuits; and a process in which the control circuit determines whether the electrical connection state is normal or abnormal in accordance with a level of a detected voltage of the divided voltage detection circuit for each of the plurality of voltage divider circuits.

<Supplementary Note 3>

The inkjet recording apparatus according to Supplementary Note 2, wherein the inkjet unit includes a plurality of capacitors connected in series with the plurality of termination resistors, respectively; and the control circuit determines whether the electrical connection state is normal or abnormal based on a level of a voltage detected by the divided voltage detection circuit for each of the plurality of voltage dividing circuits at a point in time after a predetermined amount of time has elapsed from a point in time at which the test voltage is output to each of the plurality of voltage divider circuits.

<Supplementary Note 4>

The inkjet recording apparatus according to Supplementary Note 1, wherein the test process includes a line insulation test process; and the line insulation test process includes:

a process in which the control circuit, together with selecting a target output circuit and a related output circuit from the plurality of control signal output circuits, not causing the operating voltage output circuit to output the operating voltage, and setting the target output circuit to a high impedance state, outputs a high-level signal to the related output circuit, and causes the test voltage output circuit to output the test voltage to two of the plurality of voltage dividing circuits corresponding to the target output circuit and the related output circuit; and a process in which the control circuit determines whether the electrical connection state is normal or abnormal according to a level of a detected voltage of the divided voltage detection circuit for a target voltage dividing circuit of the plurality of voltage dividing circuits corresponding to the target output circuit.

<Supplementary Note 5>

The inkjet recording apparatus according to Supplementary Note 4, wherein the inkjet unit includes a plurality of capacitors connected in series with the plurality of termination resistors, respectively; and the control circuit determines whether the electrical connection state is normal or abnormal based on a level of a voltage detected by the divided voltage detection circuit for each of the plurality of voltage dividing circuits at a point in time after a predetermined amount of time has elapsed from a point in time at which the test voltage is output to each of the plurality of voltage divider circuits.

<Supplementary Note 6>

The inkjet recording apparatus according any one of Supplementary Notes 2 to 5, wherein the test process includes a line-to-ground fault test process; and the line-to-ground fault test process includes:

a process in which the control circuit, together with not causing the test voltage output circuit to output the test voltage, and causing the operating voltage output circuit to output the operating voltage, causes each of the plurality of control signal output circuits to output a high level signal; and a process in which the control circuit determines whether the electrical connection state is normal or abnormal in accordance with a level of a detected voltage of the divided voltage detection circuit for each of the plurality of voltage divider circuits.

<Supplementary Note 7>

The inkjet recording apparatus according to any one of Supplementary Notes 1 to 6, wherein the control device includes a display portion arranged in correspondence with the first connector; and the control circuit controls the display portion so as to be in a display state that indicates a determination result of the electrical connection state by the test process.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An inkjet recording apparatus, comprising a control device and an inkjet unit connected by a wire harness; wherein the control device comprises:

an operating voltage output circuit capable of outputting an operating voltage;

a plurality of control signal output circuits each capable of outputting a plurality of control signals; and a first connector including a plurality of first terminals connected to a first voltage line that transmit the operating voltage and a plurality of first signal lines that transmit the plurality of control signals, the first connector being connected to a first end portion of the wire harness;

the inkjet unit comprises:

a second connector including a plurality of second terminals and connected to a second end portion of the wire harness;

a plurality of receiving circuits each supplied with the operating voltage and the plurality of control signals via a second voltage line and a plurality of second signal lines connected to the plurality of second terminals;

a plurality of termination resistors respectively connected to the plurality of second signal lines;

a plurality of piezoelectric elements each supplied with a plurality of drive signals corresponding to the plurality of control signals received by the plurality of receiving circuits; and a plurality of nozzles configured to eject ink pressurized by the plurality of piezoelectric elements;

the control device further comprises:

a test voltage output circuit capable of outputting a test voltage;

a plurality of test resistors to which the test voltage is supplied from the test voltage output circuit, and which, together with the plurality of termination resistors, constitute a plurality of voltage dividing circuits;

a divided voltage detection circuit configured to detect an output voltage of each of the plurality of voltage dividing circuits; and a control circuit configured to control the operating voltage output circuit, the plurality of control signal output circuits and the test voltage output circuit;

the control circuit executes a test process of controlling the operating voltage output circuit, the plurality of control signal output circuits, and the test voltage output circuit so as to be in a test state, and determining, according to a detection result of the divided voltage detection circuit in the test state, whether an electrical connection state between the plurality of first terminals and the plurality of second terminals is normal or abnormal; and the control circuit, after determining by the test process that the electrical connection state is normal, further executes ink ejection control by causing the operating voltage output circuit to output the operating voltage, while causing some or all of the plurality of control signal output circuits to output some or all of the plurality of control signals.

2. The inkjet recording apparatus according to claim 1, wherein the test process includes a connector connection test process; and the connector connection test process includes:

a process in which the control circuit, together with not causing the operating voltage output circuit to output the operating voltage, and setting each of the plurality of control signal output circuits to a high impedance state, causes the test voltage output circuit to output the test voltage to each of the plurality of voltage dividing circuits; and a process in which the control circuit determines whether the electrical connection state is normal or abnormal in accordance with a level of a detected voltage of the divided voltage detection circuit for each of the plurality of voltage divider circuits.

3. The inkjet recording apparatus according to claim 2, wherein the inkjet unit comprises a plurality of capacitors connected in series with the plurality of termination resistors, respectively; and the control circuit determines whether the electrical connection state is normal or abnormal based on a level of a voltage detected by the divided voltage detection circuit for each of the plurality of voltage dividing circuits at a point in time after a predetermined amount of time has elapsed from a point in time at which the test voltage is output to each of the plurality of voltage divider circuits.

4. The inkjet recording apparatus according to claim 1, wherein the test process includes a line insulation test process; and the line insulation test process includes:

a process in which the control circuit, together with selecting a target output circuit and a related output circuit from the plurality of control signal output circuits, not causing the operating voltage output circuit to output the operating voltage, and setting the target output circuit to a high impedance state, outputs a high-level signal to the related output circuit, and causes the test voltage output circuit to output the test voltage to two of the plurality of voltage dividing circuits corresponding to the target output circuit and the related output circuit; and a process in which the control circuit determines whether the electrical connection state is normal or abnormal according to a level of a detected voltage of the divided voltage detection circuit for a target voltage dividing circuit of the plurality of voltage dividing circuits corresponding to the target output circuit.

5. The inkjet recording apparatus according to claim 4, wherein the inkjet unit comprises a plurality of capacitors connected in series with the plurality of termination resistors, respectively; and the control circuit determines whether the electrical connection state is normal or abnormal based on a level of a voltage detected by the divided voltage detection circuit for each of the plurality of voltage dividing circuits at a point in time after a predetermined amount of time has elapsed from a point in time at which the test voltage is output to each of the plurality of voltage divider circuits.

6. The inkjet recording apparatus according to claim 2, wherein the test process includes a line-to-ground fault test process; and the line-to-ground fault test process includes:

a process in which the control circuit, together with not causing the test voltage output circuit to output the test voltage, and causing the operating voltage output circuit to output the operating voltage, causes each of the plurality of control signal output circuits to output a high level signal; and a process in which the control circuit determines whether the electrical connection state is normal or abnormal in accordance with a level of a detected voltage of the divided voltage detection circuit for each of the plurality of voltage divider circuits.

7. The inkjet recording apparatus according to claim 4, wherein the test process includes a line-to-ground fault test process; and the line-to-ground fault test process includes:

a process in which the control circuit, together with not causing the test voltage output circuit to output the test voltage, and causing the operating voltage output circuit to output the operating voltage, causes each of the plurality of control signal output circuits to output a high level signal; and a process in which the control circuit determines whether the electrical connection state is normal or abnormal in accordance with a level of a detected voltage of the divided voltage detection circuit for each of the plurality of voltage divider circuits.

8. The inkjet recording apparatus according to claim 1, wherein the control device includes a display portion arranged in correspondence with the first connector; and the control circuit controls the display portion so as to be in a display state that indicates a determination result of the electrical connection state by the test process.

* * * * *